(12) United States Patent
Cao

(10) Patent No.: US 6,560,015 B1
(45) Date of Patent: *May 6, 2003

(54) HIGH-ISOLATION DENSE WAVELENGTH DIVISION MULTIPLEXER UTILIZING BIREFRINGENT PLATES AND A NON-LINEAR INTERFEROMETER

(75) Inventor: Simon X. F. Cao, San Mateo, CA (US)

(73) Assignee: Avanex Corporation, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/404,005

(22) Filed: Sep. 23, 1999

(51) Int. Cl.[7] .............................. G02B 5/30; H04J 14/02; H04J 14/06
(52) U.S. Cl. .................. 359/487; 359/495; 359/497; 359/122; 359/124; 385/11; 385/24; 385/31; 385/33
(58) Field of Search ................... 359/122, 124, 359/484, 487, 495, 497, 900; 385/11, 24, 31, 33

(56) References Cited

U.S. PATENT DOCUMENTS

| | | | |
|---|---|---|---|
| 4,741,588 A | | 5/1988 | Nicia et al. |
| 5,033,830 A | * | 7/1991 | Jameson |
| 5,471,340 A | | 11/1995 | Cheng et al. |
| 5,499,132 A | | 3/1996 | Tojo et al. |
| 5,606,439 A | | 2/1997 | Wu |
| 5,689,360 A | * | 11/1997 | Kurata et al. ............ 359/484 |
| 5,694,233 A | | 12/1997 | Wu et al. |
| 5,724,165 A | | 3/1998 | Wu |
| 5,768,005 A | | 6/1998 | Cheng et al. |
| 5,867,291 A | | 2/1999 | Wu et al. |
| 5,912,748 A | | 6/1999 | Wu et al. |
| 6,075,647 A | * | 6/2000 | Braun et al. |
| 9,630,891 | | 8/2000 | Cao |
| 6,130,971 A | * | 10/2000 | Cao ........................ 385/31 |
| 9,740,180 | | 12/2000 | Cao et al. |
| 6,169,604 B1 | * | 1/2001 | Cao |
| 6,169,626 B1 | * | 1/2001 | Chen et al. |
| 6,169,828 B1 | * | 1/2001 | Cao ........................ 385/31 |
| 6,205,270 B1 | * | 3/2001 | Cao ........................ 385/11 |
| 6,215,926 B1 | * | 4/2001 | Cao ........................ 385/24 |
| 6,236,506 B1 | * | 5/2001 | Cao ........................ 359/487 |
| 6,263,126 B1 | * | 7/2001 | Cao ........................ 385/24 |
| 6,263,129 B1 | * | 7/2001 | Cao ........................ 385/24 |
| 6,307,677 B2 | * | 10/2001 | Cao |
| 6,310,690 B1 | * | 10/2001 | Cao et al. |
| 6,310,993 B1 | * | 10/2001 | Cao et al. |
| 6,393,176 B1 | * | 5/2002 | Cao |
| 6,396,629 B1 | * | 5/2002 | Cao |
| 6,421,480 B2 | * | 7/2002 | Cao |
| 9,645,232 | | 8/2002 | Cao |

* cited by examiner

Primary Examiner—Ricky D Shafer
(74) Attorney, Agent, or Firm—Sawyer Law Group LLP

(57) ABSTRACT

The present invention provides a dense wavelength division multiplexer for separating an optical signal into optical channels. The dense wavelength division multiplexer includes at least one birefringent plate for separating one or more of the plurality of optical channels, where the separating mechanism is at least partially based on the polarity of the plurality of optical channels, and a nonlinear interferometer optically coupled to the at least one birefringent plate for introducing a phase difference between at least two of the plurality of optical channels. In a preferred embodiment, the mechanism of separating includes birefringent beam separation and recombination plates, optical rotation elements, a lens and a non-linear interferometer. The present invention provides an ease in alignment and a higher tolerance to drifts due to the increase in the widths of the pass bands and also provides an improved efficiency of separation of channels.

20 Claims, 13 Drawing Sheets

US 6,560,015 B1

HIGH-ISOLATION DENSE WAVELENGTH DIVISION MULTIPLEXER UTILIZING BIREFRINGENT PLATES AND A NON-LINEAR INTERFEROMETER

FIELD OF THE INVENTION

The present invention relates to fiber optic networks, and more particularly to fiber optic dense wavelength division multiplexers.

BACKGROUND OF THE INVENTION

Fiber optic networks are becoming increasingly popular for data transmission due to their high speed and high data capacity capabilities. Multiple wavelengths may be transmitted along the same optic fiber. This totality of multiple combined wavelengths comprises a single transmitted signal. A crucial feature of a fiber optic network is the separation of the optical signal into its component wavelengths, or "channels", typically by a wavelength division multiplexer. This separation must occur in order for the exchange of wavelengths between signals on "loops" within networks to occur. The exchange occurs at connector points, or points where two or more loops intersect for the purpose of exchanging wavelengths.

Add/drop systems exist at the connector points for the management of the channel exchanges. The exchanging of data signals involves the exchanging of matching wavelengths from two different loops within an optical network. In other words, each signal drops a channel to the other loop while simultaneously adding the matching channel from the other loop.

FIG. 1 illustrates a simplified optical network 100. A fiber optic network 100 could comprise a main loop 150 which connects primary locations, such as San Francisco and New York. In-between the primary locations is a local loop 110 which connects with loop 150 at connector point 140. Thus, if local loop 110 is Sacramento, wavelengths at San Francisco are multiplexed into an optical- signal which will travel from San Francisco, add and drop channels with Sacramento's signal at connector point 140, and the new signal will travel forward to New York. Within loop 110, optical signals would be transmitted to various locations within its loop, servicing the Sacramento area. Local receivers (not shown) would reside at various points within the local loop 10 to convert the optical signals into the electrical signals in the appropriate protocol format.

The separation of an optical signal into its component channels is typically. performed by a dense wavelength division multiplexer. FIG. 2 illustrates add/drop systems 200 and 210 with dense wavelength division multiplexers 220 and 230. An optical signal from Loop 110 ($\lambda_1$–$\lambda_n$) enters its add/drop system 200 at node A (240). The signal is separated into its component channels by the dense wavelength division multiplexer 220. Each channel is then outputted to its own path 250-1 through 250-n. For example, $\lambda_1$ would travel along path 250-1, $\lambda_2$ would travel along path 250-2, etc. In the same manner, the signal from Loop 150 ($\lambda_1'$–$\lambda_n'$) enters its add/drop system 210 via node C (270). The signal is separated into its component channels by the wavelength division multiplexer 230. Each channel is then outputted via its own path 280-1 through 280-n. For example, $\lambda_1'$ would travel along path 280-1, $\lambda_2'$ would travel along path 280-2, etc.

In the performance of an add/drop function, for example, $\lambda_1$ is transferred from path 250-1 to path 280-1. It is combined with the others of Loop 150's channels into a single new optical signal by the dense wavelength division multiplexer 230. The new signal is then returned to Loop 150 via node D (290). At the same time, $\lambda_1'$ is transferred from path 280-1 to path 250-1. It is combined with the others of Loop 110's channels into a single optical signal by the dense wavelength division multiplexer 220. This new signal is then returned to Loop 110 via node B (260). In this manner, from Loop 110's frame of reference, channel $\lambda_1$ of its own signal is dropped to Loop 150 while channel $\lambda_1'$ of the signal from Loop 150 is added to form part of its new signal. The opposite is true from Loop 150's frame of reference. This is the add/drop function.

Conventional methods used by wavelength division multiplexers in separating an optical signal into its component channels include the use of filters and fiber gratings as separators. A "separator," as the term is used in this specification, is an integrated collection of optical components functioning as a unit which separates one or more channels from an optical signal. Filters allow a target channel to pass through while redirecting all other channels. Fiber gratings target a channel to be reflected while all other channels pass through. Both filters and fiber gratings are well known in the art and will not be discussed in further detail here.

Strictly speaking, a multiplexer combines channels from separate, inputs into a single combined output and a de-multiplexer separates combined channels from a single input to different respective output paths. It is well known in the art, however, that a multiplexer can generally perform the operation of de-multiplexing or that a de-multiplexer can perform the operation of multiplexing by simple reversal of the channel direction.

A problem with the conventional separators is the precision required of a device for transmitting a signal into an optic fiber. A signal entering a wavelength division multiplexer must conform to a set of very narrow pass bands. FIG. 3 shows a sample spectrum curve 310 comprised of numerous channels as it enters a dense wavelength division multiplexer. The pass bands 320 of the channels are very narrow. Ideally, the curve would be a square wave. A narrow pass band is problematic because, due to the physical limitations and temperature sensitivity of signal source laser devices, they never emit light exactly at the center wavelength of an optical filter. The difference between the actual wavelength and the wavelength at the center of the pass band is called the "offset." The amount of offset or change in offset ("drift") ideally should not be larger than the width of the pass bands. Otherwise, crosstalk between channels will be too large. Crosstalk occurs when one channel or part of a channel appears as noise on another channel adjacent to it. Since the signals resulting from the conventional wavelength division multiplexer configurations have narrow pass bands, the signal source devices ("transmitter"), such as lasers or the like, must be of a high precision so that offset or drift is limited to the width of the pass bands. This high precision is difficult to accomplish. Signal transmitting devices of high precision are available but are very expensive. Also, the signal transmitting devices must be aligned individually for each separator, which is time intensive.

Therefore, there exists a need for a separation mechanism which would allow a wavelength division multiplexer to have a greater tolerance for wavelength offset and drift and a greater ease of alignment than is realized by conventional separators. The present invention addresses such a need.

SUMMARY OF THE INVENTION

The present invention provides a dense wavelength division multiplexer for separating an optical signal into optical channels. The dense wavelength division multiplexer includes at least one birefringent plate for separating one or more of the plurality of optical channels, where the separating mechanism is at least partially based on the polarity of the plurality of optical channels, and a nonlinear interferometer optically coupled to the at least one birefringent plate for introducing a phase difference between at least two of the plurality of optical channels. In a preferred embodiment, the mechanism of separating includes birefringent beam separation and recombination plates, optical rotation elements, a lens and a non-linear interferometer. The present invention provides an ease in alignment and a higher tolerance to drifts due to the increase in the widths of the pass bands and also provides an improved efficiency of separation of channels. It may also be easily modified to perform the add/drop function as it separates channels. The materials required to manufacture and implement the dense wavelength division multiplexer in accordance with the present invention are readily available. The present invention thus does not require special or expensive materials or processes. It is thus cost effective.

DETAILED DESCRIPTION OF THE INVENTION

The present invention relates to an improvement in the separation mechanism to be used in a dense wavelength division multiplexer. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A separator utilizing a polarization beam splitter and a non-linear interferometer which more advanced than conventional separators is disclosed in U.S. Pat. No. 6,169,604, assigned to the assignee of the present application.

Figure 1:
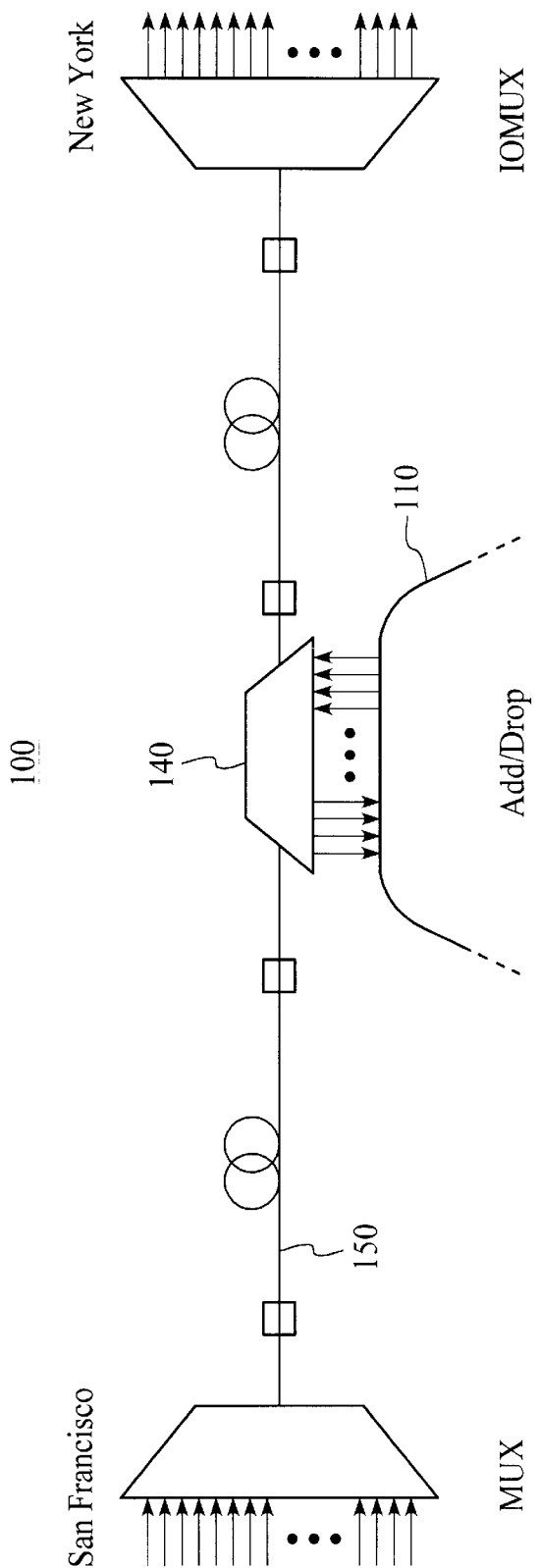
FIG. 1 is an illustration of a simplified optical network.
Figure 2:
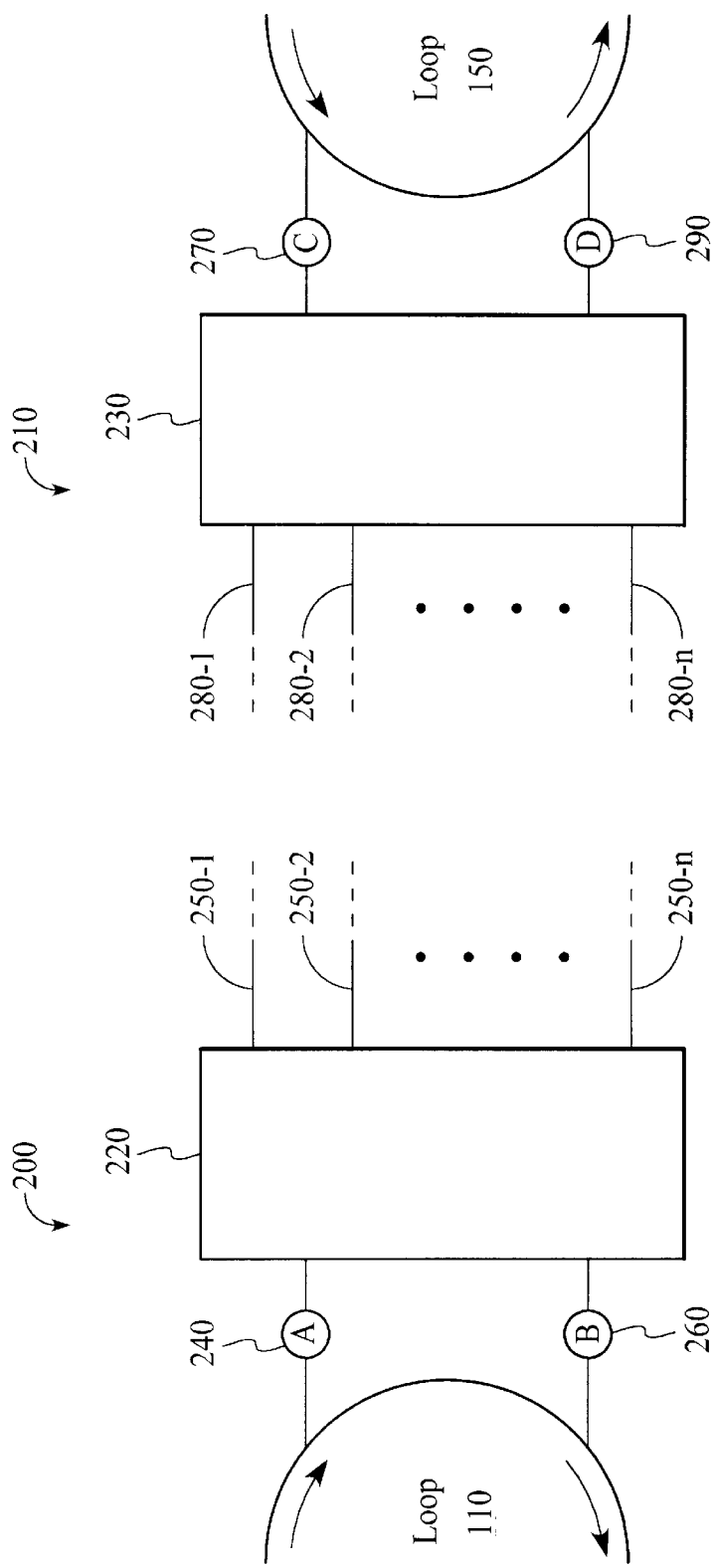
FIG. 2 is an illustration of conventional add/drop systems and dense wavelength division multiplexers.
Figure 3:
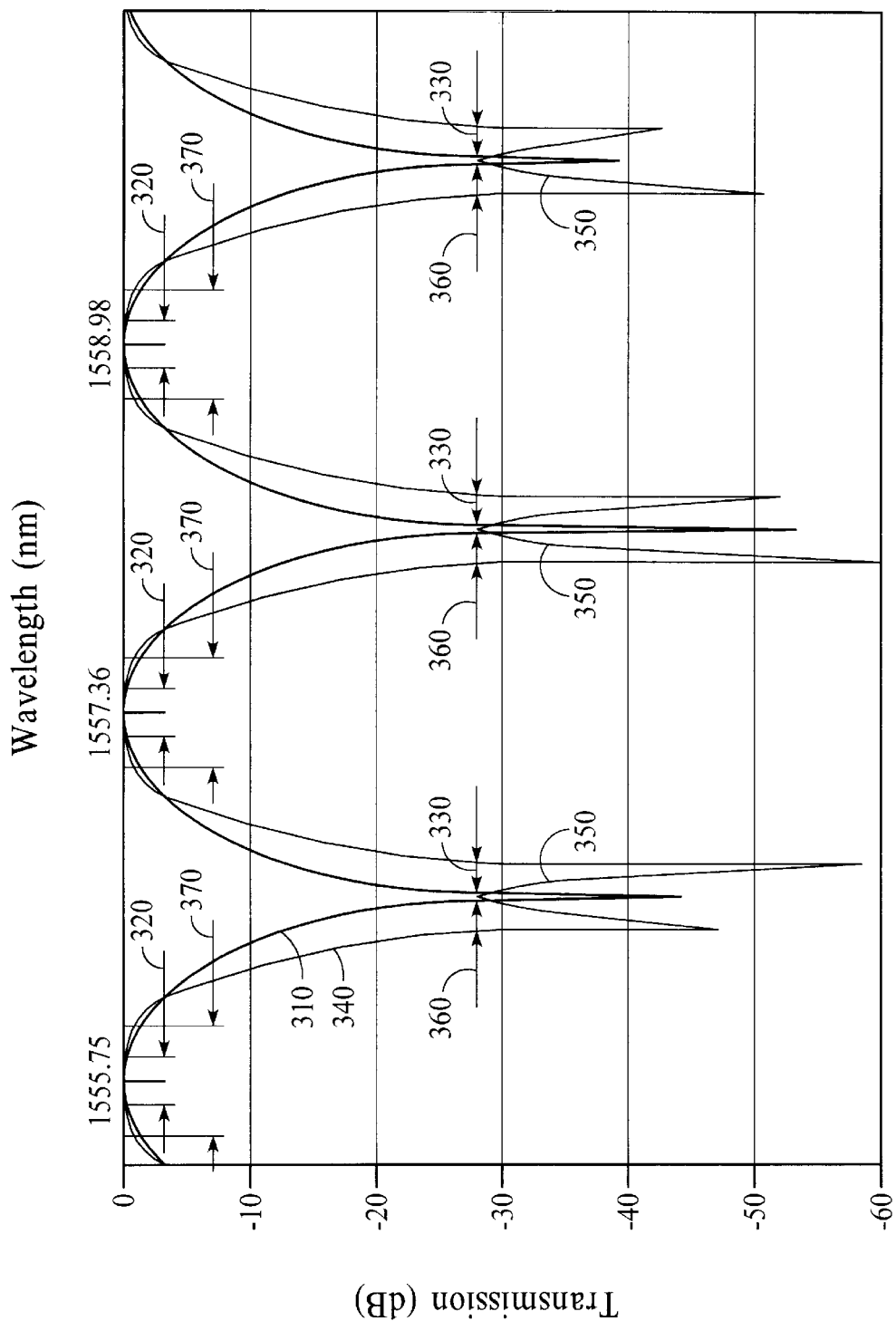
FIG. 3 is a graph of two sample spectrum curves, each comprised of several channels, as they enter, respectively, a conventional wavelength division multiplexer and a dense wavelength division multiplexer in accordance with the present invention.
Figure 4:
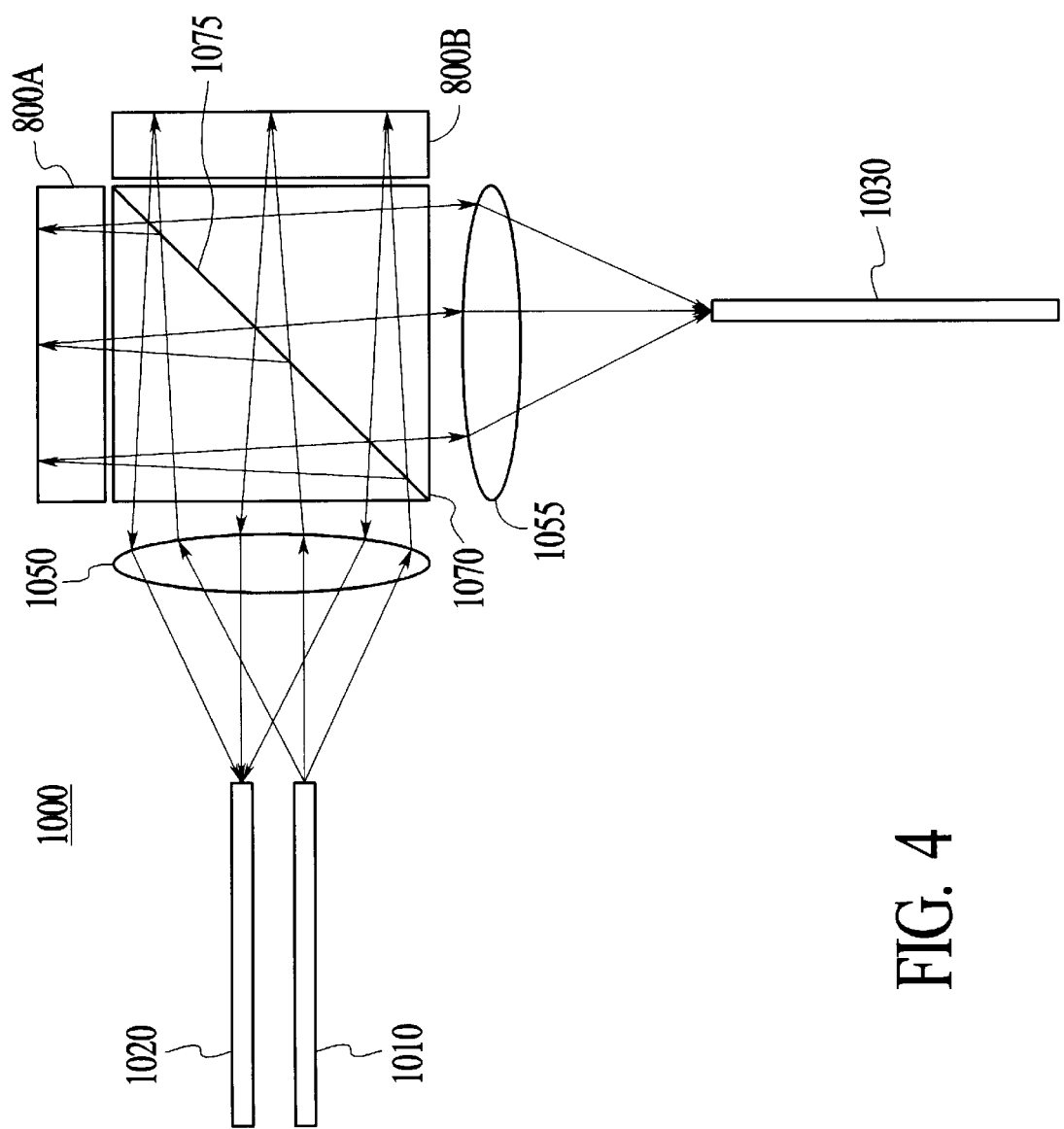
FIG. 4 is an illustration of an embodiment of a separator utilizing a polarization beam splitter and a non-linear interferometer.

FIG. 4 illustrates a top view of a preferred embodiment of the separator 1000 disclosed in U.S. Pat. No. 6,169,604. This separator 1000 separates the signal into two sets of channels. The separator 1000 comprises an optical fiber 1010 for inputting an optical signal and optical fibers 1020 and 1030 for outputting optical signals. As the signal leaves the optic fiber 1010, it diverges. A first lens 1050 collimates the signal and directs it towards a beam splitter 1070 which decomposes the signal based upon its polarization. This decomposition takes place at a plane 1075 of the beam splitter 1070. The component (p-component) of the input signal polarized within the plane defined by the input signal's direction of travel and a line perpendicular to plane 1075 passes through beam splitter 1070 towards an interferometer 800B. The component (s-component) of the input signal polarized parallel to plane 1075 is reflected towards an interferometer 800A. The interferometers 800A and 800B introduce phase differences between the even and odd channels of the signals. The even channels are focused into one output fiber 1030 by a second lens 1055, and the odd channels are focused into the other output fiber 1020 by the second lens 1055.

This separator 1000 has advantages over conventional separators in terms of increased widths of the pass bands and isolation bands and greater ease of alignment. Although the separator 1000 is useful for its stated purpose, it may be limited, in some cases, by the properties of the polarization beam splitter 1070 used therein. A perfect polarization beam splitter will separate an incident unpolarized light beam into two plane polarized component light beams with mutually perpendicular polarization orientations such that each component beam comprises 100% of the light of one polarization orientation and none of the light of the other orientation. However, in real beam splitters, which can never be perfect, there is always a small amount of leakage of light rays of one polarization orientation into the pathway nominally comprised only of light with the other polarization orientation. Because of this leakage, there will be imperfect isolation of one set of signals from another in the separator 1000. The separator in accordance with the present invention improves upon the separator illustrated in FIG. 4.

To more particularly describe the features of the present invention, please refer to FIGS. 5 through 14 in conjunction with the discussion below.

Figure 5:
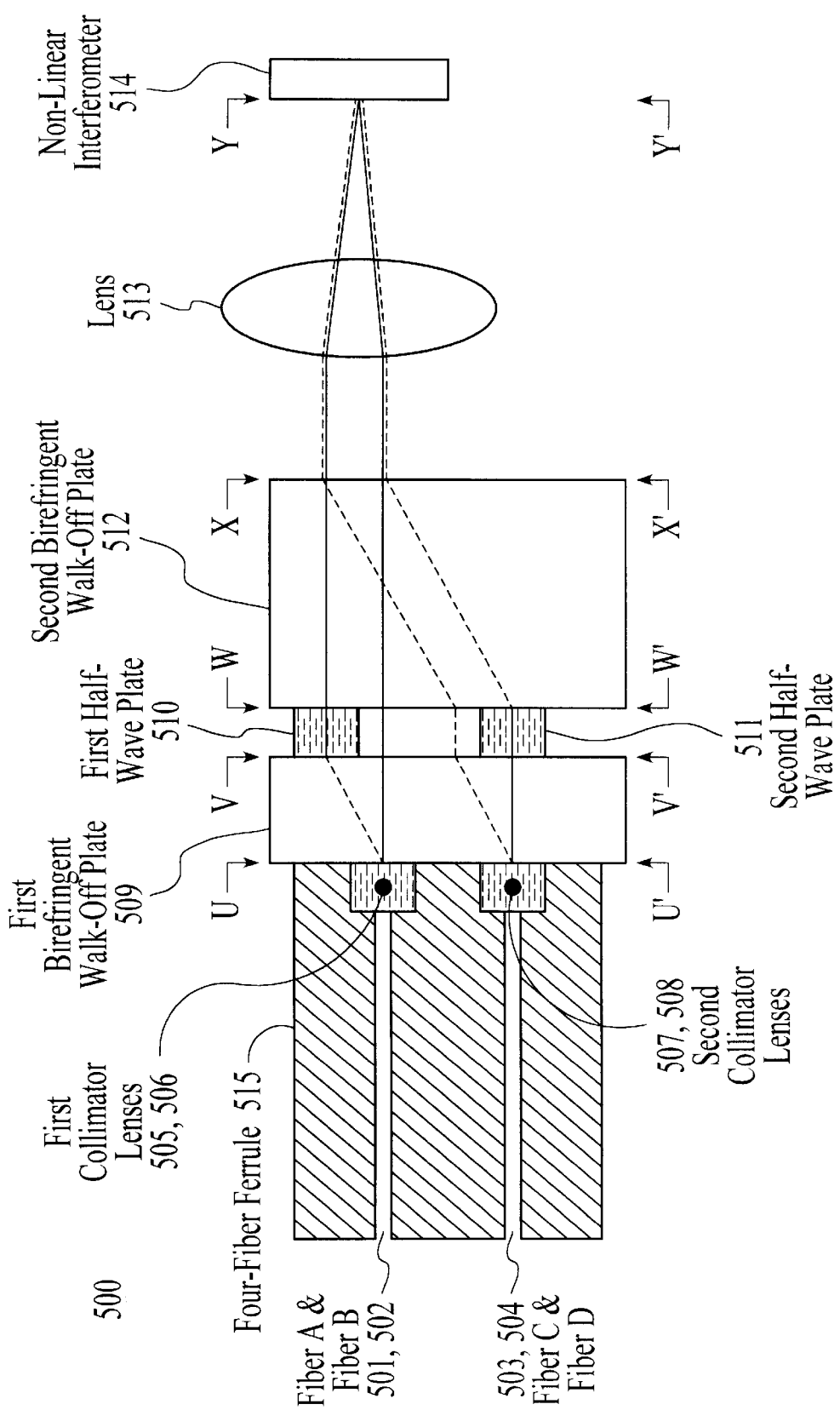
FIG. 5 is a side view of a first embodiment of the separator in accordance with the present invention.
Figure 6:
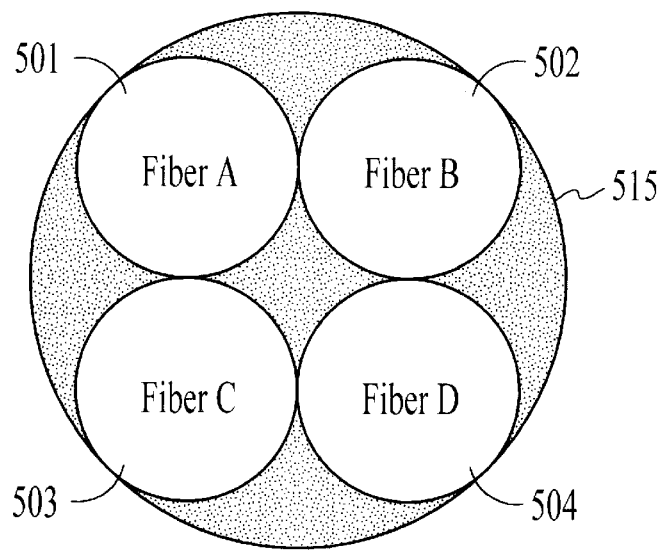
FIG. 6 is an end view of the fiber configuration of the input and output fibers of the separator of the present invention.

FIG. 5 shows a side view of a first embodiment of the separator in accordance with the present invention. The first embodiment of the separator 500 comprises a four fiber ferrule 515 with four optical fibers, Fiber A 501, Fiber B 502, Fiber C 503 and Fiber D 504 contained within and secured to ferrule 515. FIG. 6 shows an end view of the fiber configuration as viewed from the left side of the device of FIG. 5. Four collimator lenses 505, 506, 507 and 508 are incorporated into the end of ferrule 515 such that each collimator receives light from and directs light to exactly one of the fibers, specifically Fiber A 501, B 502, C 503 and D 504, respectively.

Returning to FIG. 5, disposed adjacent to the end of ferrule 515 is a first birefringent walk-off plate 509 which has the property of separating any signal light ray emanating from any of the fibers 501, 502, 503 or 504 into two physically separated plane polarized sub-signal rays—one innermost and one outermost sub-signal ray. Because four fibers are contained within ferrule 515, eight separate sub-signals are so defined and are comprised of four outermost and four innermost sub-signals. The optical axes of birefringent plate 509 are disposed such that outermost and innermost sub-signals from both Fiber A 501 and Fiber B 502 comprise e-rays and o-rays, respectively, in their traverse through birefringent plate 509. Conversely, the outermost and innermost sub-signals from both Fiber C 503 and Fiber D 504 comprise o-rays and e-rays, respectively, in their traverse through birefringent plate 509.

In this specification, the polarization plane directions of e-rays and o-rays are referred to as "vertical" and "horizontal," respectively. Such orientation disposition references are used in a relative sense only and are made for the clarity of the discussion and the convenience of the reader and by no means imply restriction of the use of the present invention to particular absolute spatial orientations of elements contained therein or of polarization planes of light rays propagating therethrough. Various modifications of the embodiments of the present invention for use with these and other spatial orientations will be understood by one of ordinary skill in the art and are within the spirit and scope of the present invention.

Disposed adjacent to the first birefringent plate 509 and on the side of plate 509 opposite to ferrule 515 are both a first half-wave plate 510 and a second half-wave plate 511. Half-wave plate 510 is disposed so as to intercept only the two outermost sub-signals arising from Fiber A 501 and Fiber B 502. Likewise, half-wave plate 511 is disposed so as to intercept only the two outermost sub-signals arising from Fiber C 503 and Fiber D 504. A second birefringent walk-off plate 512 is disposed adjacent to the two half-wave plates 510 and 511 on the side opposite to the first birefringent plate 509. The thickness of birefringent plate 512 is disposed so as to give an offset of one of the rays propagating therethrough equivalent to the center-to-center distance between any pair of fibers. A lens or lens assembly 513 is disposed to the side of the second birefringent walk-off plate 512 opposite to the half wave plates 510 and 511. Finally, a non-linear interferometer 514 is disposed at the focal point of lens 513 opposite to the birefringent plate 512.

Figure 7:
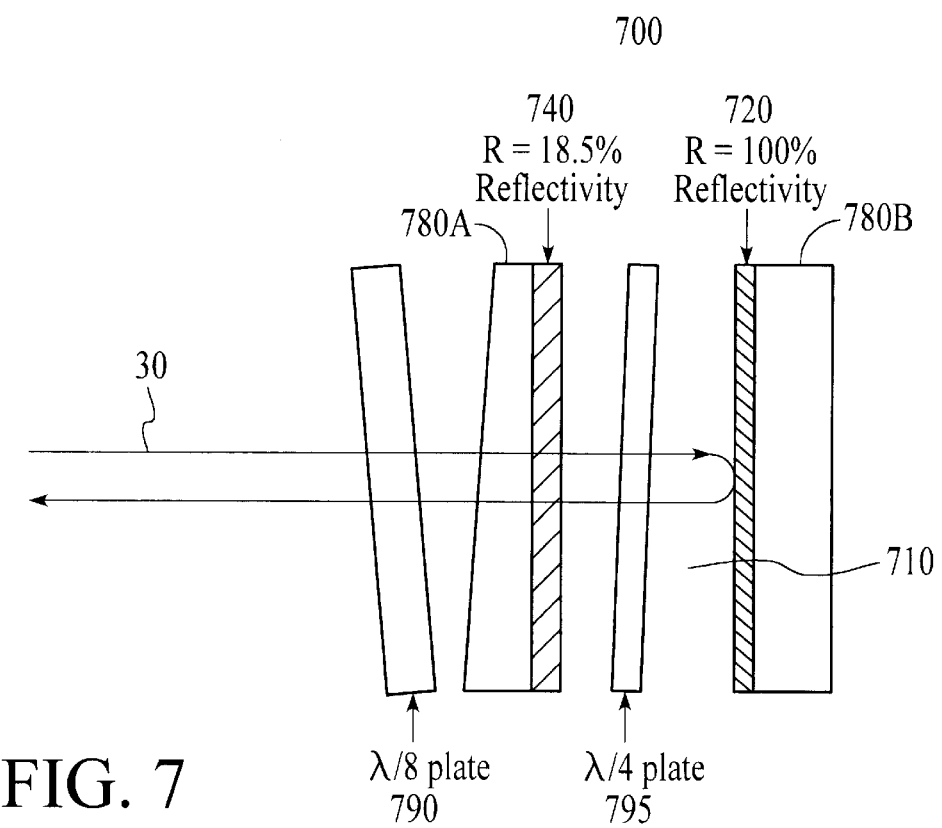
FIG. 7 is an illustration of a preferred embodiment of a nonlinear interferometer used with the separator of the present invention.

The non-linear interferometer 514 is an instance of an invention disclosed in the co-pending U.S. patent application Ser. No. 09/247,253. FIG. 7 illustrates a preferred embodiment of an interferometer described in patent application Ser. No. 09/247,253. The interferometer 700 comprises two parallel glass plates 780A and 780B with a space or cavity 710 therebetween. The inside face of the glass plate 780B is coated with a layer of reflective coating 720 with a reflectivity preferably of 100%. The inside face of the glass plate 780A is coated with a layer of reflective coating 740 with a reflectivity preferably of approximately 18%. A quarter-wave plate 795 is disposed within the space 710 and an eighth-wave plate 790 is disposed adjacent to plate 780A and external to the space 710.

When signal 30 enters the interferometer 700, it passes through the 18% reflective coating 740 and a waveplate 795 preferably of $\lambda/4$. The $\lambda/4$ plate 795 introduces an 180° round trip phase change between an o-beam and e-beam of the signal inside the cavity 710, and the external $\lambda/8$ plate 790 introduces a round trip 90° phase change between the o-beam and e-beam. The waveplate 790, preferably of $\lambda/8$, fine tunes the shape of the signal 30.

Returning to FIG. 5, the non-linear interferometer 514 has the property such that, if the light beam reflected therefrom is an optical signal comprised of a plurality of channels evenly spaced in wavelength and the light of each channel is plane polarized, then the light of every second channel is reflected with a 90° rotation of its polarization plane direction whilst the light of each remaining channel is reflected with unchanged polarization. In the following discussion, the channels whose light rays experience the 90+ polarization-plane rotation upon interaction with non-linear interferometer 514 are arbitrarily referred to as even channels and the remaining channels are referred to as odd channels. The use of such terminology, i.e., "even channels" or "odd channels", in this specification is made for the convenience of the reader only and does not imply restriction of the present invention to any particular optical channel wavelength distribution, wavelength spacing or enumeration scheme. Adaptation of the present invention for use with any one of numerous optical channel configurations and or systems will be understood by one of ordinary skill in the art and is within the spirit and scope of the present invention. Furthermore, it will be understood by one of ordinary skill in the art that the non-linear interferometer comprising this invention may also be constructed so as to rotate polarization planes of light rays of the "odd channels" instead of those of light rays of the "even channels" without departing from the spirit and scope of the present invention.

Figure 8:
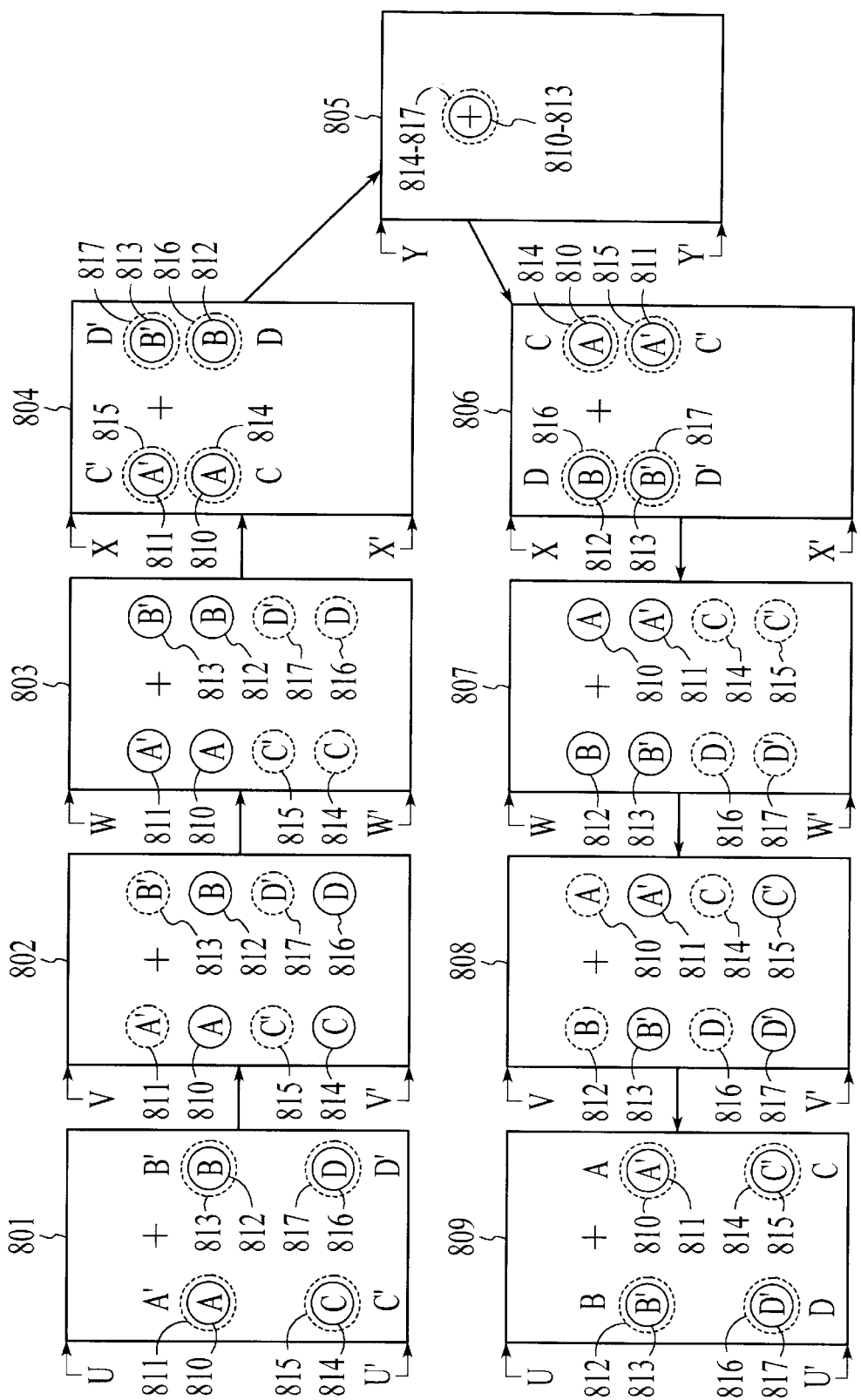
FIG. 8 is a sequence of cross sections through the first embodiment of the separator of the present invention illustrating the locations and polarization states of fiber images created by the light of signals and sub-signals of odd channels.
Figure 9:
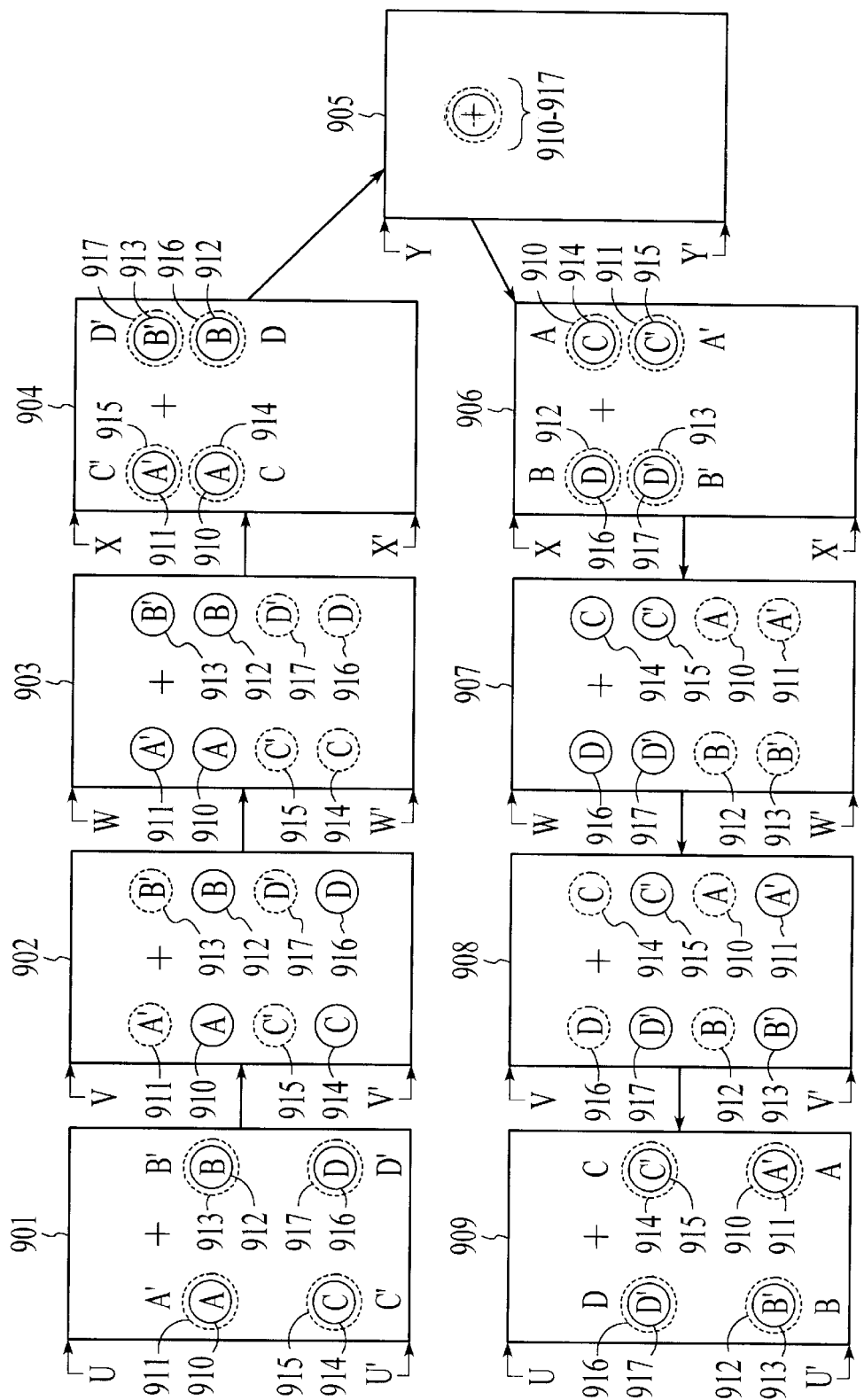
FIG. 9 is a sequence of cross sections through the first embodiment of the separator of the present invention illustrating the locations and polarization states of fiber images created by the light of signals and sub-signals of even channels.

The operation of separator 500 is now described with reference to FIGS. 8 and 9. FIG. 8 shows a sequence of cross sectional views 801–809 of fiber images created by the light of signals and sub-signals of odd channels within separator 500. FIG. 9 shows a sequence of cross sectional views 901–909 of fiber images created by the light of signals and sub-signals of even channels within separator 500. These cross-sections are all drawn as viewed from the left side of the device 500 and are taken at the labeled cross-sectional planes U–U', V–V', W–W', X–X', and Y–Y'. These cross-sections correspond to locations similarly labeled on FIG. 5. The projection of the center of lens 513—that is, a point midway between the two lens surfaces and collinear with the front and rear foci of the lens—along the line connecting the two foci and onto each of these cross sections is designated by a plus ("+") sign. In FIGS. 8 and 9, circles drawn with solid lines are used to denote sub-signals comprised of horizontally polarized light, circles drawn with dotted lines are used to denote sub-signals comprised of vertically polarized light, and concentric solid and dotted circles are used to denote overlapping sub-signals of differing polarization or else signals of mixed or random polarization. The sizes of these circles have no physical significance. All sub-signal light is reflected in the non-linear interferometer 514 of separator 500 so as to make one complete forward and one complete return traverse through separator 500. Therefore, each cross-section of sub-signal fiber images is shown twice, and heavy arrows indicate the relative sequence of images defined by light propagating through separator 500.

The paths of signals and sub-signals of odd channels are now described with reference to FIG. 8. As seen in cross section U–U' 801 of FIG. 8, signals emanating from each of the four fibers—Fiber A 501, Fiber B 502, Fiber C 503 and Fiber D 504—are comprised of randomly polarized light. After emanating from one of the four fibers and passing through one of the collimator lenses 505–508, each light signal enters and passes through the first birefringent plate 509 which divides it into physically separated sub-signal components whose light rays are polarized horizontally and vertically, respectively. In FIG. 8, sub-signal A 810, sub-signal B 812, sub-signal C 814 and sub-signal D 816 represent the horizontally polarized sub-signal light emanating, respectively, from Fiber A 501, Fiber B 502, Fiber C 503 and Fiber D 504. Likewise, sub-signal A' 811, sub-signal B' 813, sub-signal C' 815 and sub-signal D' 817 represent the vertically polarized sub-signal light emanating, respectively, from Fiber A 501, Fiber B 502, Fiber C 503 and Fiber D 504.

The four vertically polarized sub-signals A' 811, B' 813, C' 815 and D' 817 all comprise e-rays during their traverse through the first birefringent plate 509. Therefore, as shown in cross-section V–V' 802 of FIG. 8, sub-signals 811, 813, 815 and 817 are all shifted in a first direction perpendicular to the fiber axes with respect to the matching horizontally polarized sub-signals, A 810, B 812, C 814 and D 816, respectively. After passing the first birefringent plate 509, the four outermost sub-signals A' 811, B' 813, C 814 and D 816 pass through one of the two 90° half-wave plates, 510 and 511, and therefore each sub-signal incurs a 90° rotation of the polarization plane direction of its light rays. Thus, as shown in cross section W–W' 803 of FIG. 8, the polarization plane directions of light rays of sub-signals A' 811 and B' 813 change from vertical to horizontal whilst those of light rays of sub-signals C 814 and D 816 change from horizontal to vertical.

After passing the positions of the half-wave plates 510 and 511, all sub-signals enter and pass through the second birefringent walk-off plate 512. The four sub-signals comprised of vertically polarized light, C' 815, D' 817, C 814 and D 816, traverse birefringent plate 512 as e-rays and are thus deflected. Simultaneously, the four sub-signals comprised of horizontally polarized light, A' 811, B' 813, A 810 and B 812, traverse birefringent plate 512 as undeflected o-rays. The thickness of birefringent plate 512 is chosen such that the lateral deflection of e-rays upon traversing therethrough is in the first direction and is exactly equal to the inter-fiber center-to-center distance. For this reason, after passing through birefringent plate 512, the two sub-signal images C' 815 and C 814 become superimposed on the sub-signal images A' 811 and A 810, respectively and the two sub-signal images D' 817 and D 816 become superimposed on the sub-signal images B' 813 and B 812, respectively. This superimposition of sub-signals is shown in cross section X–X' 804 of FIG. 8.

The line connecting the two foci of lens 513 is indicated by a plus symbol where it intersects each of the cross sections of FIGS. 8 and 9. As indicated in FIG. 8 (or FIG. 9), the lens 513 is positioned such that, between second birefringent plate 512 and lens 513, the four pairs of superimposed sub-signals are symmetrically disposed about this line connecting the two foci of lens 513. This symmetry is such that, between second birefringent plate 512 and lens 513, the four pairs of superimposed sub-signals define two mutually orthogonal planes of mirror symmetry whose intersection is the line connecting the two foci of lens 513. In cross section X–X' of FIG. 8 (or FIG. 9), the four sub-signals A' 811, C' 815, B' 813 and D' 817 are mirrored by sub-signals A 810, C 814, B 812 and D 816 through the first such, or horizontal, mirror plane. The four sub-signals A' 811, C' 815, A 810 and C 814 are mirrored by sub-signals B' 813, D' 817, B 812 and D 816 through the second such, or vertical, mirror plane.

After exiting plate 512, each pair of superimposed sub-signals, A' 811 and C' 815, A 810 and C 814, B' 813 and D' 817, and B 812 and D 816 travels along its own path with the two sub-signal!s comprising each pair remaining superimposed, one upon the other and with all pathways parallel to the line connecting the two foci of lens 513. These four pairs of sub-signals travel to and through the lens 513, which brings them all to a common focal point within the non-linear interferometer 514 as shown in cross-section Y–Y' 805 of FIG. 8. The non-linear interferometer 514 reflects these odd-channel sub-signals back along their return paths through separator 500 without a change in polarization. Thus, the four pairs of sub-signals immediately diverge from one another after being reflected by the non-linear interferometer 514 and pass through lens 513 a second time in the reverse direction. The diverging pathways of the four pairs of returning sub-signals are set parallel to one another by lens 513. Thus, these four pairs of sub-signals are directed back towards the second birefringent plate 512 along pathways which, between the birefringent plate 512 and the lens 513, exactly superimpose upon those of forward propagating pairs of sub-signals and which once again, are parallel to the line connecting the two foci of lens 513.

Cross section x–x' 806 of FIG. 8 shows the locations of the pairs of superimposed sub-signal images at their points of return entry into birefringent plate 512. The focusing and re-collimation of sub-signal images by lens 513, together with the reflection by the nonlinear interferometer 514, cause the inversion of image positions about the center of the lens as projected onto cross-section x–x' 806. This inversion causes interchange of the positions of the various pairs of sub-signals as projected onto cross-section x–x' 806. Thus, upon re-entry into plate 512, as shown in cross-section x–x' 806 of FIG. 8, the location of the returning pair of sub-signal images B 812 and D 816 is the same as that of the forward propagating pair of sub-signals A' 811 and C' 815. Likewise, in cross-section x–x' 806 of FIG. 8, the locations of returning pairs of sub-signals A 810 and C 814, B' 813 and D' 817, and A' 811 and C' 815 are identical to those of forward propagating pairs of sub-signals B' 813 and D' 817, A 810 and C 814, and B 812 and D 816, respectively.

During return passage through the second birefringent plate 512, the sub-signals comprised of vertically polarized light, D 816, C 814, D' 817 and C' 815, pass therethrough as deflected e-rays whilst those comprised of horizontally polarized light, B 812, A 810, B' 813 and A' 811, pass therethrough as undeflected o-rays. For this reason, the two sub-signals comprising each pair of superimposed sub-signals become re-separated one from another upon passing through birefringent plate 512 a second time. The deflection of sub-signals D 816, C 814, D' 817 and C' 815 upon their second traverse through birefringent plate 512 is exactly equal and opposite to their deflection during their first traverse through this plate. Therefore, the locations of the images of the various sub-signals after the second traverse of these sub-signals through birefringent plate 512 are as shown in cross section w–w' 807 of FIG. 8.

After exiting the second birefringent plate 512, the outermost returning sub-signals B 812, A 810, D' 817 and C' 815 pass through one of the two 90° half-wave plates, 510 and 511, and therefore each incurs a 90° rotation of the polarization plane direction of its light rays. After passing, in the return direction, the positions of the 90° half-wave plates, 510 and 511, the positions and polarization states of the various sub-signals are as shown in cross section v–v' 808 of FIG. 8.

Finally, all sub-signals enter the first birefringent walk-off plate 509 in the return direction. The sub-signals comprised of vertically polarized light, B 812, A 810, D 816 and C 814, pass through plate 509 as deflected e-rays whilst those comprised of horizontally polarized light, B' 813, A' 811, D' 817 and C' 815, pass through plate 509 as undeflected o-rays. The deflection of sub-signals B 812, A 810, D 816 and C 814 during return passage through plate 509 is exactly equal and opposite to the deflection of sub-signals B' 813, A' 811, D' 817 and C' 815 during their forward passage through this plate. Therefore, the vertically and horizontally polarized pairs of sub-signals A 810 and A' 811, B 812 and B' 813, C 814 and C' 815, and D 816 and D' 817 become recombined at the positions of the fiber collimator lenses 505–508. Each of the collimator lenses focuses the return-path signal impinging thereon into the immediately adjacent fiber. As shown in cross section u–u' 809 of FIG. 8, therefore, the recombined signals are located such that the signals originally from Fiber A 501, Fiber B 502, Fiber C 503 and Fiber D 504 are directed into Fiber B 502, Fiber A 501, Fiber D 504 and Fiber C 503, respectively.

The paths of signals and sub-signals of even channels through the separator 500 are now described with reference to FIG. 9. After emanating from one of the four fibers and passing through one of the collimator lenses 505–508, signal light enters and passes through the first birefringent plate 509 which separates it into physically separated horizontally and vertically polarized sub-signal components. In FIG. 9, sub-signal A 910, sub-signal B 912, sub-signal C 914 and sub-signal D 916 represent the horizontally polarized sub-signal light emanating, respectively, from Fiber A 501, Fiber B 502, Fiber C 503 and Fiber D 504. Likewise, sub-signal A' 911, sub-signal B' 913, sub-signal C' 915 and sub-signal D' 917 represent the vertically polarized sub-signal light emanating, respectively, from Fiber A 501, Fiber B 502, Fiber C 503 and Fiber D 504.

The forward propagating pathways of even channel sub-signals through separator 500 are identical to those of odd channel sub-signals up until they encounter the non-linear interferometer 514 and will not be repeated here. Upon reflection from non-linear interferometer 514, however, the directions of the polarization planes of light of even channel sub-signals are all rotated by 90°. As a consequence, after reflection from non-linear interferometer 514 and embarkation upon their return pathways, the light rays comprising sub-signals A 910, B 912, A' 911, and B' 913, become vertically polarized whilst the light rays comprising sub-signals C 914, D 916 C' 915 and D' 917 become horizontally polarized.

Cross section x–x' 906 of FIG. 9 shows the locations and polarization states of even-channel sub-signal images upon their re-entry into second birefringent walk-off plate 512. During return passage through the second birefringent plate 512, the sub-signals comprised of vertically polarized light, B 912, A 910, B' 913 and A' 911, pass therethrough as deflected e-rays whilst those comprised of horizontally polarized light D 916, C 914, D' 917 and C' 915 pass therethrough as undeflected o-rays. For this reason, the two sub-signals comprising each pair of superimposed sub-signals become re-separated one from another upon passing through birefringent plate 512 a second time. The common deflection of sub-signals B 912, A 910, B' 913 and A' 911 upon their second traverse through birefringent plate 512 is exactly equal and opposite to the deflection of sub-signals C 914, D 916, C' 915 and D' 917 during their first traverse through this plate. Therefore, the locations of the various sub-signals after the second traverse of these sub-signals through birefringent plate 512 are as shown in cross section w–w' 907 of FIG. 9.

After exiting the second birefringent plate 512, the outermost returning sub-signals D 916, C 914, B' 913 and A' 911 pass through one of the two 900 half-wave plates, 510 and 511, and therefore each incurs a 90° rotation of the polarization plane direction of its light rays. After passing, in the return direction, the positions of the 90° half-wave plates, 510 and 511, the positions and polarization states of the various sub-signals are as shown in cross section v–v' 908 of FIG. 9.

Finally, all sub-signals enter the first birefringent walk-off plate 509 in the return direction. The vertically polarized sub-signals D 916, C 914, B 912 and A 910 pass through plate 509 as deflected e-rays whilst the horizontally polarized sub-signals D' 917, C' 915, B' 913 and A' 911 pass through plate 509 as undeflected o-rays. The common deflection of sub-signals D 916, C 914, B 912 and A 910 during their return passage through plate 509 is exactly equal and opposite to the deflection of sub-signals D' 917, C' 915, B' 913 and A' 911 during their forward passage through this plate. Therefore, the vertically and horizontally polarized pairs of sub-signals A 910 and A' 911, B 912 and B' 913, C 914 and C' 915, and D 916 and D' 917 become recombined at the positions of the fiber collimator lenses 505–508. Each of the collimator lenses focuses the return-path signal impinging thereon into the immediately adjacent fiber. As shown in cross section u–u' 909 of FIG. 9, therefore, the recombined signals are located such that the signals originally from Fiber A 501, Fiber B 502, Fiber C 503, and Fiber D 504 are directed into Fiber D 504, Fiber C 503, Fiber B 502 and Fiber A 501, respectively.

Figure 10:
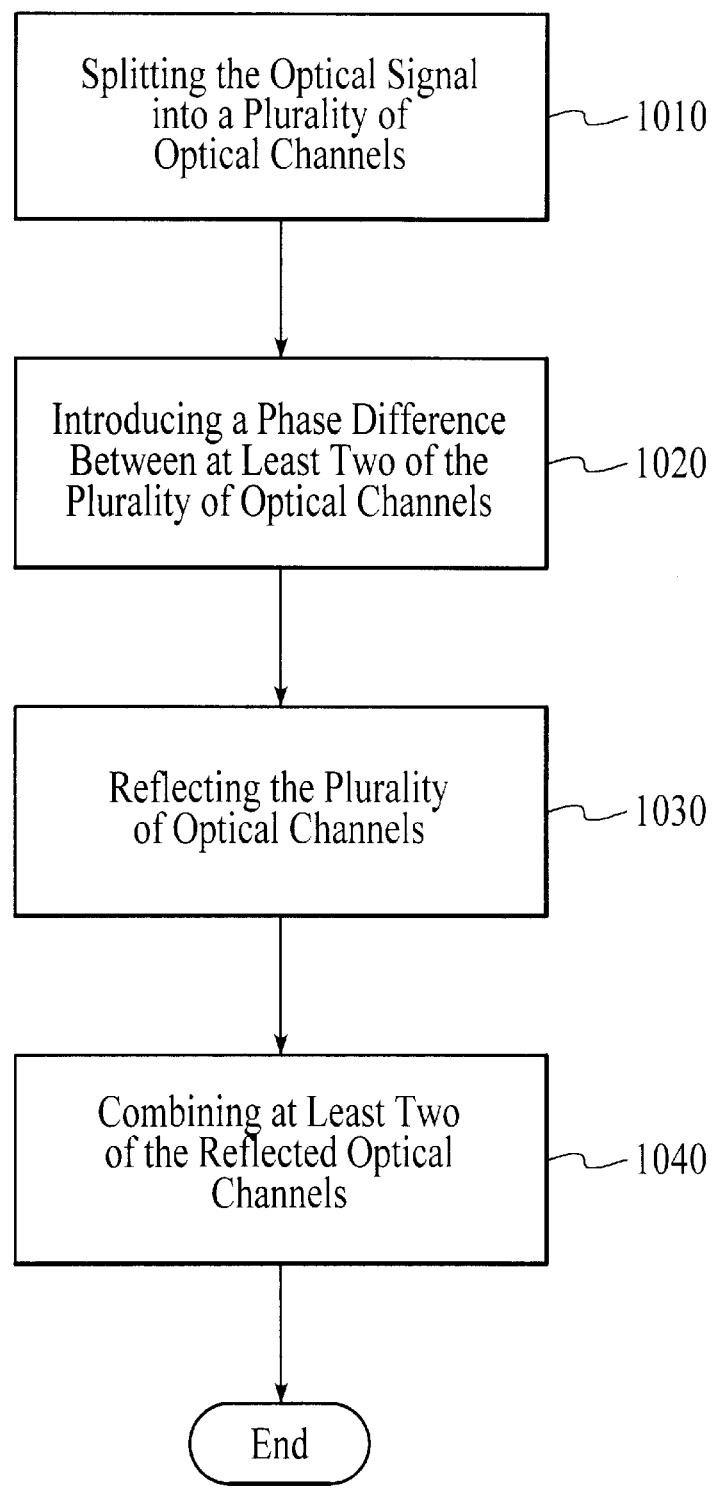
FIG. 10 is a flow chart illustrating a preferred embodiment of a method for separating an optical signal in accordance with the present invention.

FIG. 10 is a flow chart illustrating a preferred embodiment of a method for separating an optical signal in accordance with the present invention. First, the optical signal is split into a plurality of optical channels, via step 1010, using the birefringent plates 509, 512 and wave plates 510, 511, as described above. Then, a phase difference is introduced between at least two of the plurality of optical channels, via step 1020, by the nonlinear interferometer 514. Next, the plurality of optical channels are reflected, via step 1030, by the nonlinear interferometer 514. At least two of the reflected optical channels are then combined, via step 1040, by the birefringent plates 509, 512 and wave plates 510, 511, as described above.

Figure 11:
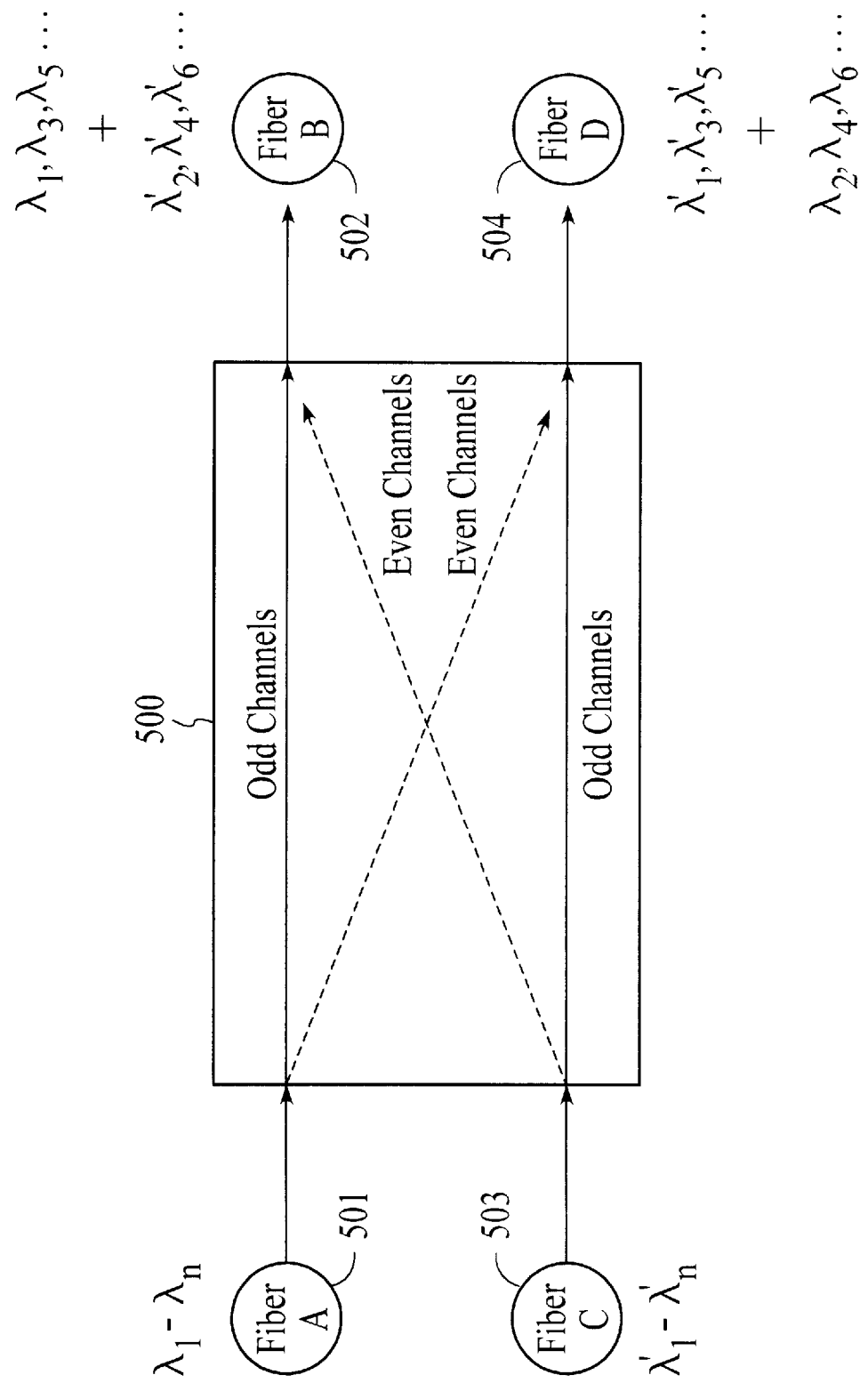
FIG. 11 is a functional signal routing diagram for the separator of the present invention illustrating its functioning as a 2×2 switch.

FIG. 11 summarizes the results of the operation of separator 500. Odd-channel signals input to the separator 500 from Fiber A 501 and Fiber C 503 are directed to Fiber B 502 and Fiber D 504, respectively, whereas even channel signals input to the separator 500 from Fiber A 501 and Fiber C 503 are directed to Fiber D 504 and Fiber B 502, respectively. Similarly, odd-channel signals input to the separator 500 from Fiber B 502 and Fiber D 504 are directed to Fiber A 501 and Fiber C 503, respectively whereas even channel signals input to the separator 500 from Fiber B 502 and Fiber D 504 are directed to Fiber C 503 and Fiber A 501, respectively. In this way, the separator 500 functions as a dense wavelength division multiplexer or de-multiplexer which discriminates amongst the pathways of odd and even channels.

An added functionality and advantage of this and the other separators of the present invention is the ability to perform the add/drop function while also separating the channels. As illustrated in FIG. 10, two signals, a first signal containing channel signals $\lambda_1$–$\lambda_n$ and a second signal containing channel signals $\lambda_1'$–$\lambda_n'$, are input into the separator 500 through Fiber A 501 and Fiber C 503, respectively. Device 500 could then drop the even channels of the first signal to the second signal while adding the even channels of the second signal to the first signal. For instance, as shown in FIG. 10, the output at Fiber B 502 would consist of the odd channels ($\lambda_1$, $\lambda_3$, $\lambda_5$ . . . ) from the first signal plus the even channels ($\lambda_2'$, $\lambda_4'$, $\lambda_6'$ . . . ) from the second signal. In like fashion, the output at Fiber D 504 would consist of the odd channels ($\lambda_1'$, $\lambda_3'$, $\lambda_5'$ . . . ) from the second signal plus the even channels ($\lambda_2$, $\lambda_4$, $\lambda_6$ . . . ) from the first signal.

In the first embodiment of the current invention, separator 500, the second birefringent walk-off plate 512 must be of the exact thickness so as to cause a lateral deflection of e-rays equivalent to the inter-fiber center-to-center distance. This requirement may create difficulties in some circumstances.

Figure 12:
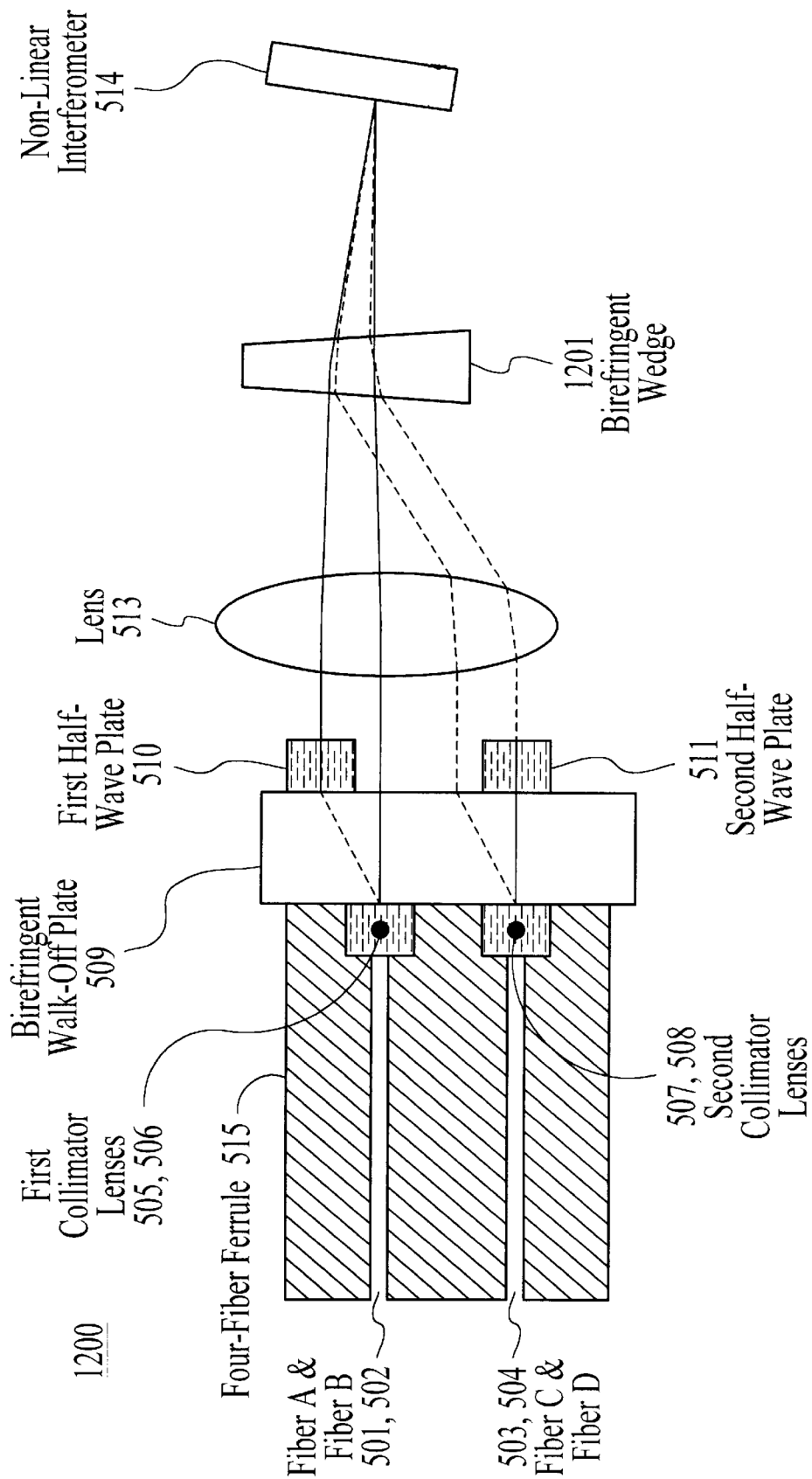
FIG. 12 is a side view of a second embodiment of the separator in accordance with the present invention.

A second embodiment of the present invention, which eliminates this requirement, is shown in FIG. 12. In the separator 1200 shown in FIG. 12, the four-fiber ferrule 515, the fibers 501–504, the four collimator lenses 505–508, the first birefringent plate 509, the first and second 90° half-wave plates 510 and 512, the lens 513 and the non-linear interferometer 514 are common to the separator 500. However, in the separator 1200, there is no second birefringent walk-off plate between the half-wave plates 510 and 511 and the lens 513. Instead, there is a birefringent wedge 1201 disposed between the lens 513 and the non-linear interferometer 514. Furthermore, the separator 1200 is constructed such that signal light emanating from Fiber A 501 and Fiber B 502 passes through the center of lens 513 whereas signal light emanating from Fiber C 503 and Fiber D 504 passes through the edge of lens 513.

The focusing properties of the lens in separator 1200 cause deflection of sub-signal rays emanating from Fiber C 503 and Fiber D 504 in the first direction, that is, in the direction of the paths of the sub-signal rays emanating from Fiber A 501 and Fiber B 502. After passing through lens 513, all sub-signals are intercepted by the birefringent wedge 1201. Because of the double-refraction properties and orientation of the birefringent wedge 1201, this wedge refracts or deflects the sub-signals comprised of horizontally polarized light—those from fibers 503 and 504—to a greater extent than it refracts or deflects the sub-signals comprised of vertically polarized light—those from fibers 501 and 502. The birefringent wedge 1201 is shaped and oriented such that the difference in deflection therein between the sub-signals from fibers 501 and 502 and those from fibers 503 and 504 is equal and opposite to the lens-induced deflection of sub-signals from fibers 503 and 504. The combination of the lens 513 and the wedge 1201 in this fashion causes a superimposition of sub-signal images from fibers 501 and 502 with those of fibers 503 and 504, respectively.

The superimposition is similar to that shown in cross section X–X' 804 of FIG. 8 or X–X' 904 of FIG. 9, except that the sub-signal ray paths are deflected slightly off the separator main axis—a line parallel to the input and output fibers-by the wedge. For this latter reason, the non-linear interferometer 514 is tilted, as shown in FIG. 12, by a similar angle relative to its position in separator 500.

Aside from the means of superimposing sub-signal images, the operation of the second separator embodiment, separator 1200, is identical to that of the first embodiment, separator 500, and will not be repeated here. The separator 1200 has the advantage that a birefringent wedge of precise thickness is not required to superimpose the various sub-signal images. However, for proper operation, the deflections imposed by the lens 513 and the wedge 1201 must be precisely matched. This matching condition may be accomplished via slight adjustments to the position and tilt angle of the wedge 1201.

Figure 13:
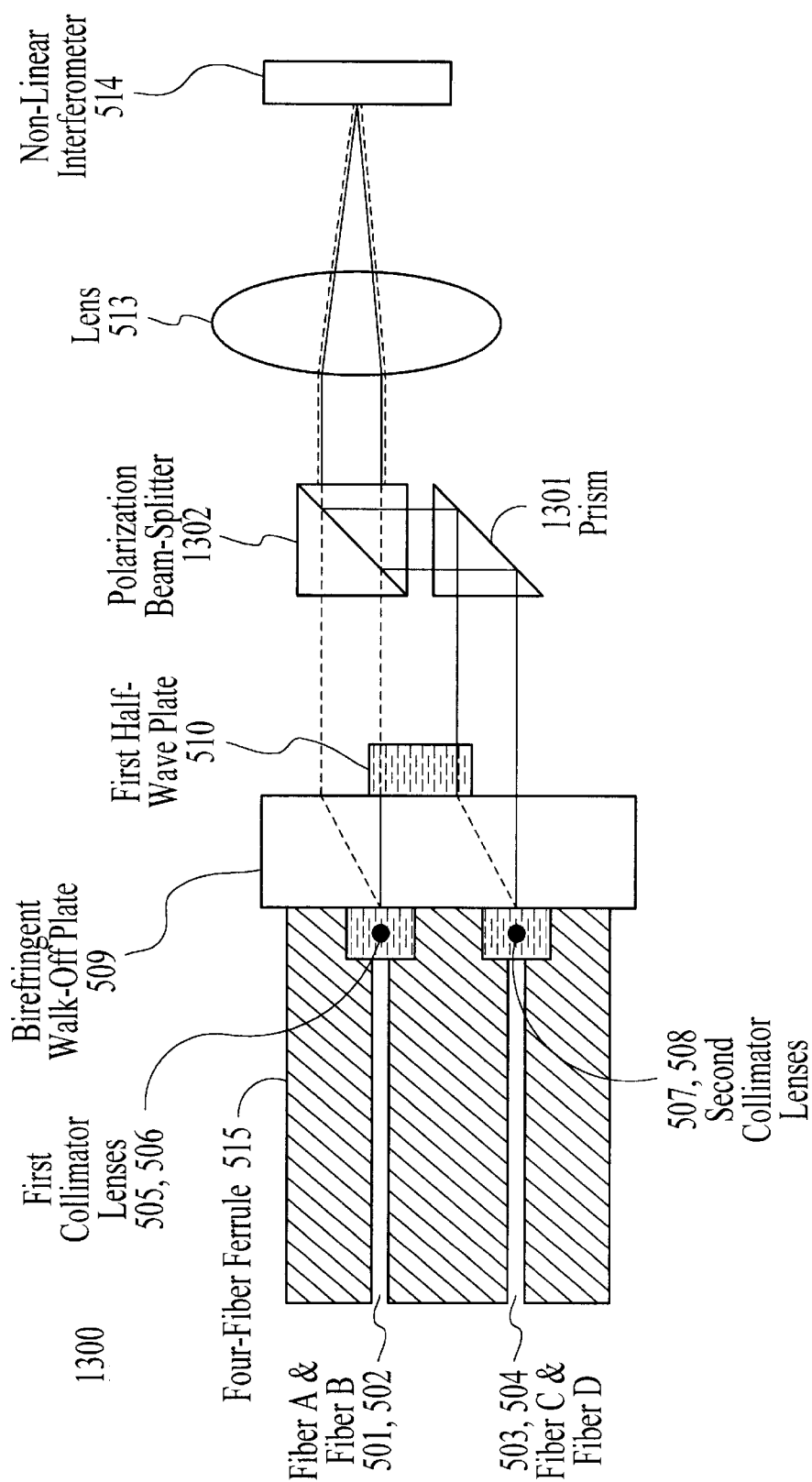
FIG. 13 is a side view of a third embodiment of the separator in accordance with the present invention.

A third embodiment of the current invention is shown in FIG. 13. In the separator 1300 shown in FIG. 13, the four-fiber ferrule 515, the four fibers 501–504, the four collimator lenses 505–508, the first birefringent plate 509, the first and second 90° half-wave plates 510 and 511, the lens 513 and the non-linear interferometer 514 are common to the separator 500. However, in the separator 1300, there is only a single half-wave plate 510, and there is no second birefringent walk-off plate between the half-wave plate 510 and the lens 513. Instead, there is a prism 1301 and also a polarization beam splitter 1302 both disposed between the half-wave plate 510 and the lens 513. The half-wave plate 510 is disposed so as to intercept only the four innermost rays emanating from or destined for the four input/output ports, as shown in FIG. 13. The prism 1301 is disposed so as to intercept the signals emanating from Fiber C 503 and Fiber D 504 and turn or deflect their directions of propagation by 90°. This turning direction is in the first direction, that is, in the direction of signals emanating from Fiber A 501 and fiber B 502 and such that the signals emanating from Fiber C 503 and Fiber D 504 are subsequently intercepted by the polarization beam splitter 1302. The polarization beam splitter is disposed such that light sub-signals emanating from Fiber A 501 and Fiber B 502 pass therethrough without deflection whilst sub-signals emanating from Fiber C 503 and Fiber D 504, after having been deflected by the prism 1301, are deflected by 90° by the polarization beam splitter. The combined to deflections by prism 1301 and polarization beam splitter 1302 upon the propagation paths of signals emanating from Fiber C 503 and Fiber D 504 are such that, subsequent to passage through polarization beam splitter 1302, sub-signals from Fiber A 501 and Fiber B 502 are superimposed upon those from Fiber C 503 and Fiber D 504, respectively.

The superimposition of sub-signals in the separator 1300 is identical to that already described for separator 500 and is as exactly as shown in FIGS. 8 and 9 for sub-signals of odd and even channels, respectively. The operation of separator 1300 is similar to that shown in FIGS. 8 and 9 and described in reference thereto except that the cross-section X–X' is disposed to the side of polarization beam splitter 1302 facing lens 513, and the orientations of polarization planes of all sub-signals differ by 90 degrees (relative to their respective orientations in the separator 500) along the sub-signal pathways between the half-wave plate 510 and the non-linear interferometer 514. The forward-propagating pathways of odd-channel sub-signals C' 815, D' 817, C 814 and D 816 and of even-channel sub-signals C' 915, D' 917, C 914 and D 916 are all deflected by 90° by the prism 1301. Subsequently, these same sub-signals are deflected by 90° by the polarization beam splitter 1302 such that, as shown in cross section X–X' 804 of FIG. 8 and X–X' 904 of FIG. 9, the sub-signals from Fiber A 501 and Fiber B 502 are superimposed upon those from Fiber C 503 and Fiber D 504, respectively. The sub-signals C' 815, D' 817, C 814, D 816, C' 915, D' 917, C 914 and D 916 are all horizontally polarized before entering prism 1301. After being deflected by and exiting prism 1301, these sub-signals remain horizontally polarized. The horizontal polarization of sub-signals C' 815, D' 817, C 814, D 816, C' 915, D' 917, C 914 and D 916 comprises s-polarization with respect to the polarization beam splitter 1302 and thus the paths of these sub-signals are deflected by 90° at the polarization beam splitter 1302. The sub-signals A' 811 B' 813, A 810, B 812, A' 911, B' 913, A 910 and B 912 are all vertically polarized before entering polarization beam splitter 1302. This vertical polarization comprises p-polarization with respect to the polarization beam splitter 1302 and thus these sub-signals are transmitted directly through beam splitter 1302 without deflection. By this means, the sub-signals from Fiber A 501 and Fiber B 502 become superimposed upon those from Fiber C 503 and Fiber D 504, respectively. Other aspects of the operation of separator 1300 are identical to those already described for separator 500 and will not be repeated here.

The separator of the present invention has the advantage, relative to separators of conventional wavelength division multiplexers, of a higher tolerance to drifts due to the increase in the widths of the pass bands provided by the non-linear interferometers contained therein. It offers the further advantage, relative to separators and dense wavelength division multiplexers utilizing polarization beam splitters, of a greater efficiency of separation between the sets of separated channels. This latter advantage arises because physical separation of beam paths is effected by birefringent walk-off plates, rather than polarization beam splitters. The efficiency of separation of an unpolarized light beam into a first light beam comprising a first plane polarization direction and a second light beam comprising a second plane polarization direction perpendicular to the first is greater for a birefringent plate than it is for a polarization beam splitter. That is, the degree of isolation of a first set of signals from contamination from a second set of signals physically separated according to the differing plane polarization directions of the light rays of which they comprised is much greater for the separator of the present invention than it is for separators based upon polarization beam splitters.

Figure 14:
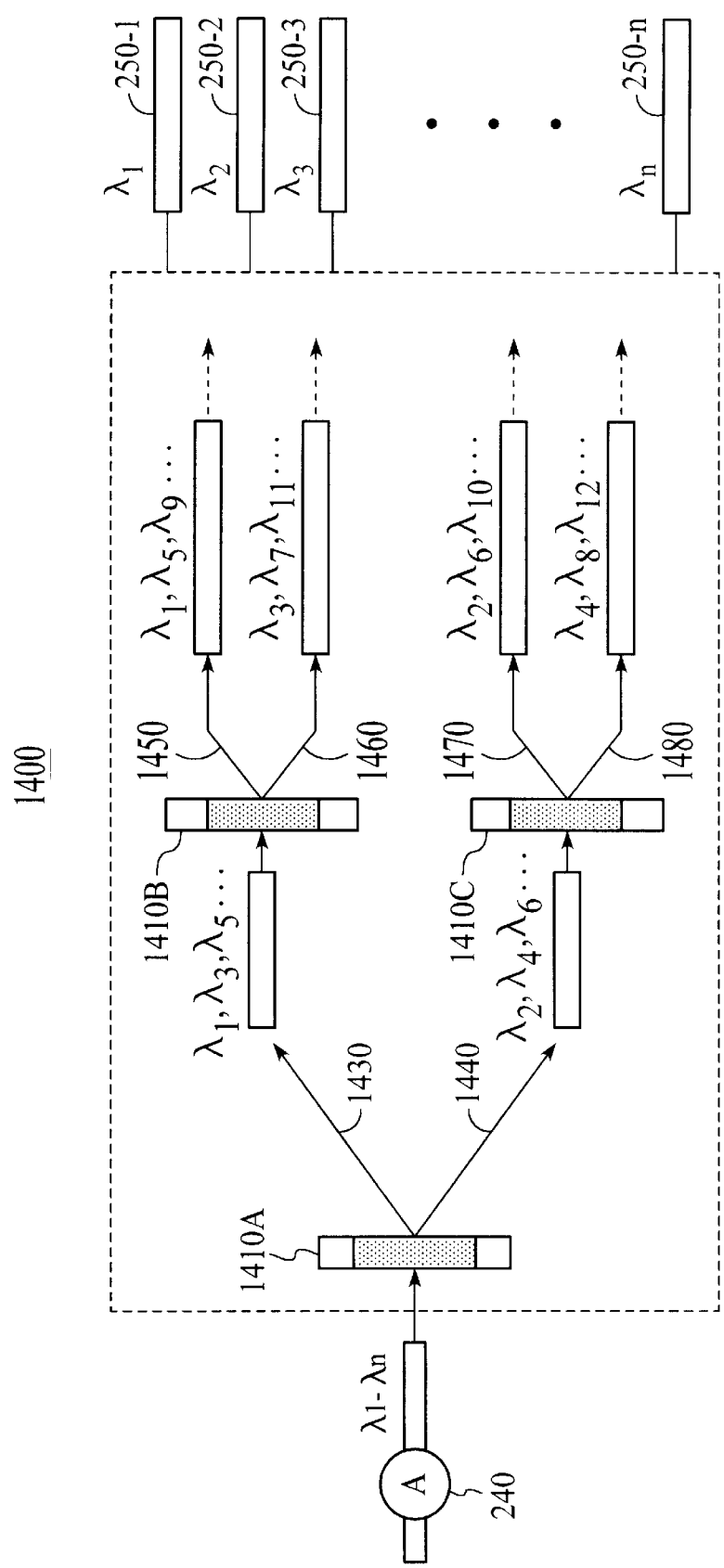
FIG. 14 is a simple block diagram of a wavelength division multiplexer with a multi-stage parallel cascade configuration of separators in accordance with the present invention.

Another advantage of the separators of the present invention is the ability to place them in a multi-stage parallel cascade configuration to reduce insertion loss as part of a larger dense wavelength division multiplexer. This configuration is illustrated in FIG. 14 and has been disclosed in co-pending U.S. patent application entitled "Fiber Optic Dense Wavelength Division Multiplexer Utilizing a Multi-Stage Parallel Cascade Method of Wavelength Separation," Ser. No. 09/130,386, filed on Aug. 6, 1998. Applicant hereby incorporates this application by reference. In FIG. 14, an optical signal containing channels $\lambda_1$–$\lambda_n$ enters the dense wavelength division multiplexer 1400 of the present invention through Node A 240. The signal passes through a separator 1410A of the present invention. The separator 1410A divides the signal into two separate signals, one containing the odd channels ($\lambda_1, \lambda_3, \lambda_5 \ldots$) (1430) and the other containing the even channels ($\lambda_2, \lambda_4, \lambda_6 \ldots$) (1440) as described above. These odd and even channels are each passed through another separator, 1410B and 1410C, respectively, which further divides them by every other channel. The separator 1410B, and specifically the set of non-linear interferometers (not shown) comprising this separator, is modified so as to separate the set of channels $\lambda_1$, $\lambda_5, \lambda_9 \ldots$ from the set of channels $\lambda_3, \lambda_7, \lambda_{11} \ldots$ through adjustment of the wavelength spacing of channels whose polarization directions are rotated. Likewise, the separator 1410C, and specifically the set of non-linear interferometers comprising this separator, is modified so as to separate the set of channels $\lambda_2, \lambda_6, \lambda_{10} \ldots$ from the set of channels $\lambda_4$, $\lambda_8, \lambda_{12} \ldots$ through a similar adjustment. Similar channel division continues until only one channel is outputted to each optical fiber 250-1 through 250-n. The separators 1310A, 1310B, and 1310C may be of the first, second, or third embodiments as described above.

Although the separator of the present invention has been described as being utilized with the multi-stage parallel cascade configuration of the present invention, one of ordinary skill in the art will understand that the separator of the present invention may be utilized with other configurations without departing from the spirit and scope of the present invention.

In a dense wavelength division multiplexer constructed utilizing the present invention in a multi-stage parallel cascade configuration, there is no decrease in pass band widths relative to those of the channel separator in the first stage. This is in contrast to and an advantage over conventional filter technologies which, when concatenated in series as part of a larger optical device, cause a decrease in overall pass band width of the filter ensemble relative to any individual filter. The dense wavelength division multiplexer of the present invention is thus free of the increased insertion losses associated with such reduced pass band widths.

An improved separation mechanism to be used in a dense wavelength division multiplexer has been disclosed. The mechanism of separating one or more of the plurality of optical channels in the present invention includes birefringent beam separation and recombination plates, optical rotation elements, a lens and a non-linear interferometer. The present invention provides an ease in alignment and a higher tolerance to drifts due to the increase in the widths of the pass bands and also provides an improved efficiency of separation of channels. It may also be easily modified to perform the add/drop function as it separates channels. The materials required to manufacture and implement the dense wavelength division multiplexer in accordance with the present invention are readily available. The present invention thus does not require special or expensive materials or processes. It is thus cost effective.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A dense wavelength division multiplexer for separating an optical signal into a plurality of optical channels, comprising:
   a first birefringent plate;
   a first and second half-wave plates, each partially optically coupled to the first birefringent plate, such that the first and second half-wave plates each is capable of intercepting approximately one-half of a signal from the first birefringent plate;
   a second birefringent plate optically coupled to the first birefringent plate and to the first and second half-wave plates on a side opposite to the first birefringent plate;
   a lens optically coupled to the second birefringent plate on a side opposite to the first and second half-wave plates; and
   a non-linear interferometer optically coupled to the lens and disposed at a distance equal to the focal length of the lens on a side opposite to the second birefringent plate, wherein the non-linear interferometer introduces a phase difference between at least two of the plurality of optical channels.

2. The dense wavelength division multiplexer of claim 1, wherein the nonlinear interferometer comprises:
- a first glass plate optically coupled to a second glass plate, forming a cavity;
- a first reflective coating residing inside the cavity and on the second glass plate;
- a second reflective coating residing inside the cavity and on the first glass plate;
- a first waveplate residing inside the cavity between the first and second glass plates; and
- a second waveplate residing outside the cavity and optically coupled to the first glass plate.

3. A dense wavelength division multiplexer for separating an optical signal into a plurality of optical channels, comprising:
- a first birefringent plate;
- a first and second half-wave plates, each partially optically coupled to the first birefringent plate, such that the first and second half-wave plates each is capable of intercepting approximately one-half of a signal from the first birefringent plate;
- a second birefringent plate optically coupled to the first birefringent plate and to the first and second half-wave plates on a side opposite to the first birefringent plate;
- a lens optically coupled to the second birefringent plate on a side opposite to the first and second half-wave plates; and
- a non-linear interferometer optically coupled to the lens and disposed at a distance equal to the focal length of the lens on a side opposite to the second birefringent plate, wherein the non-linear interferometer introduces a phase difference between at least two of the plurality of optical channels, wherein the nonlinear interferometer comprises:
  - a first glass plate optically coupled to a second glass plate, forming a cavity,
  - a first reflective coating residing inside the cavity and on the second glass plate, wherein the first reflective coating comprises a reflective coating with a reflectivity of 100%,
  - a second reflective coating residing inside the cavity and on the first glass plate,
  - a first waveplate residing inside the cavity between the first and second glass plates, and
  - a second waveplate residing outside the cavity and optically coupled to the first glass plate.

4. A dense wavelength division multiplexer for separating an optical signal into a plurality of optical channels, comprising:
- a first birefringent plate;
- a first and second half-wave plates, each partially optically coupled to the first birefringent plate, such that the first and second half-wave plates each is capable of intercepting approximately one-half of a signal from the first birefringent plate;
- a second birefringent plate optically coupled to the first birefringent plate and to the first and second half-wave plates on a side opposite to the first birefringent plate;
- a lens optically coupled to the second birefringent plate on a side opposite to the first and second half-wave plates; and
- a non-linear interferometer optically coupled to the lens and disposed at a distance equal to the focal length of the lens on a side opposite to the second birefringent plate, wherein the non-linear interferometer introduces a phase difference between at least two of the plurality of optical channels, wherein the nonlinear interferometer comprises:
  - a first glass plate optically coupled to a second glass plate, forming a cavity,
  - a first reflective coating residing inside the cavity and on the second glass plate,
  - a second reflective coating residing inside the cavity and on the first glass plate, wherein the second reflective coating comprises a reflective coating with a reflectivity of approximately 18%,
  - a first waveplate residing inside the cavity between the first and second glass plates, and
  - a second waveplate residing outside the cavity and optically coupled to the first glass plate.

5. A dense wavelength division multiplexer for separating an optical signal into a plurality of optical channels, comprising:
- a first birefringent plate;
- a first and second half-wave plates, each partially optically coupled to the first birefringent plate, such that the first and second half-wave plates each is capable of intercepting approximately one-half of a signal from the first birefringent plate;
- a second birefringent plate optically coupled to the first birefringent plate and to the first and second half-wave plates on a side opposite to the first birefringent plate;
- a lens optically coupled to the second birefringent plate on a side opposite to the first and second half-wave plates; and
- a non-linear interferometer optically coupled to the lens and disposed at a distance equal to the focal length of the lens on a side opposite to the second birefringent plate, wherein the non-linear interferometer introduces a phase difference between at least two of the plurality of optical channels, wherein the nonlinear interferometer comprises:
  - a first glass plate optically coupled to a second glass plate, forming a cavity,
  - a first reflective coating residing inside the cavity and on the second glass plate,
  - a second reflective coating residing inside the cavity and on the first glass plate,
  - a first waveplate residing inside the cavity between the first and second glass plates, wherein the first waveplate comprises a $\lambda/4$ waveplate, and
  - a second waveplate residing outside the cavity and optically coupled to the first glass plate.

6. A dense wavelength division multiplexer for separating an optical signal into a plurality of optical channels, comprising:
- a first birefringent plate;
- a first and second half-wave plates, each partially optically coupled to the first birefringent plate, such that the first and second half-wave plates each is capable of intercepting approximately one-half of a signal from the first birefringent plate;
- a second birefringent plate optically coupled to the first birefringent plate and to the first and second half-wave plates on a side opposite to the first birefringent plate;
- a lens optically coupled to the second birefringent plate on a side opposite to the first and second half-wave plates; and
- a non-linear interferometer optically coupled to the lens and disposed at a distance equal to the focal length of the lens on a side opposite to the second birefringent plate, wherein the non-linear interferometer introduces a phase difference between at least two of the plurality of optical channels, wherein the nonlinear interferometer comprises:
- a first glass plate optically coupled to a second glass plate, forming a cavity,
- a first reflective coating residing inside the cavity and on the second glass plate,
- a second reflective coating residing inside the cavity and on the first glass plate,
- a first waveplate residing inside the cavity between the first and second glass plates, and
- a second waveplate residing outside the cavity and optically coupled to the first glass plate, wherein the second waveplate comprises a $\lambda/8$ waveplate.

7. A dense wavelength division multiplexer for separating an optical signal into a plurality of optical channels, comprising:
- a first birefringent plate;
- a first and second half-wave plates, each partially optically coupled to the first birefringent plate, such that the first and second half-wave plates each is capable of intercepting approximately one-half of a signal from the first birefringent plate;
- a second birefringent plate optically coupled to the first birefringent plate and to the first and second half-wave plates on a side opposite to the first birefringent plate, wherein the second birefringent plate comprises a thickness which provides an offset of an optical signal passing through it equal to the center-to-center distance between a fiber of a means for inputting the optical signal and a fiber of a means for outputting the separated plurality of optical channels;
- a lens optically coupled to the second birefringent plate on a side opposite to the first and second halfwave plates; and
- a non-linear interferometer optically coupled to the lens and disposed at a distance equal to the focal length of the lens on a side opposite to the second birefringent plate, wherein the non-linear interferometer introduces a phase difference between at least two of the plurality of optical channels.

8. A dense wavelength division multiplexer for separating an optical signal into optical channels, comprising:
- means for inputting an optical signal, the optical signal comprising a plurality of optical channels;
- a first birefringent plate optically coupled to the inputting means and an outputting means;
- a first and second half-wave plates, each partially optically coupled to the first birefringent plate on a side opposite to the inputting and outputting means, such that the first and second half-wave plates each is capable of intercepting approximately one-half of a signal from the first birefringent plate;
- a second birefringent plate optically coupled to the first birefringent plate and to the first and second half-wave plates on a side opposite to the first birefringent plate;
- a lens optically coupled to the second birefringent plate on a side opposite to the first and second half-wave plates;
- a non-linear interferometer optically coupled to the lens and disposed at a distance equal to the focal length of the lens on a side opposite to the second birefringent plate; and
- means for outputting the separated plurality of optical channels along a plurality of optical paths.

9. The dense wavelength division multiplexer of claim 8, wherein the nonlinear interferometer comprises:
- a first glass plate optically coupled to a second glass plate, forming a cavity;
- a first reflective coating residing inside the cavity and on the second glass plate;
- a second reflective coating residing inside the cavity and on the first glass plate;
- a first waveplate residing inside the cavity between the first and second glass plates; and
- a second waveplate residing outside the cavity and optically coupled to the first glass plate.

10. A dense wavelength division multiplexer for separating an optical signal into optical channels, comprising:
- means for inputting an optical signal, the optical signal comprising a plurality of optical channels, wherein the inputting means comprises:
  - at least one lens optically coupled to a first birefringent plate, and
  - at least one optic fiber optically coupled to the at least one lens;
- the first birefringent plate optically coupled to the inputting means and an outputting means;
- a first and second half-wave plates, each partially optically coupled to the first birefringent plate on a side opposite to the inputting and outputting means, such that the first and second half-wave plates each is capable of intercepting approximately one-half of a signal from the first birefringent plate;
- a second birefringent plate optically coupled to the first birefringent plate and to the first and second half-wave plates on a side opposite to the first birefringent plate;
- a lens optically coupled to the second birefringent plate on a side opposite to the first and second half-wave plates;
- a non-linear interferometer optically coupled to the lens and disposed at a distance equal to the focal length of the lens on a side opposite to the second birefringent plate; and
- means for outputting the separated plurality of optical channels along a plurality of optical path.

11. A dense wavelength division multiplexer for separating an optical signal into optical channels, comprising:
- means for inputting an optical signal, the optical signal comprising a plurality of optical channels;
- a first birefringent plate optically coupled to the inputting means and an outputting means;
- a first and second half-wave plates, each partially optically coupled to the first birefringent plate on a side opposite to the inputting and outputting means, such that the first and second half-wave plates each is capable of intercepting approximately one-half of a signal from the first birefringent plate;
- a second birefringent plate optically coupled to the first birefringent plate and to the first and second half-wave plates on a side opposite to the first birefringent plate;
- a lens optically coupled to the second birefringent plate on a side opposite to the first and second half-wave plates;
- a non-linear interferometer optically coupled to the lens and disposed at a distance equal to the focal length of the lens on a side opposite to the second birefringent plate; and
- means for outputting the separated plurality of optical channels along a plurality of optical path, wherein the outputting means comprises:

at least one lens optically coupled to the first birefringent plate, and
at least two optic fibers optically coupled to the lens.

12. A dense wavelength division multiplexer for separating an optical signal into optical channels, comprising:
means for inputting an optical signal, the optical signal comprising a plurality of optical channels;
a first birefringent plate optically coupled to the inputting means and an outputting means;
a first and second half-wave plates, each partially optically coupled to the first birefringent plate on a side opposite to the inputting and outputting means, such that the first and second half-wave plates each is capable of intercepting approximately one-half of a signal from the first birefringent plate;
a second birefringent plate optically coupled to the first birefringent plate and to the first and second half-wave plates on a side opposite to the first birefringent plate;
a lens optically coupled to the second birefringent plate on a side opposite to the first and second half-wave plates;
a non-linear interferometer optically coupled to the lens and disposed at a distance equal to the focal length of the lens on a side opposite to the second birefringent plate; and
means for outputting the separated plurality of optical channels along a plurality of optical path,
wherein the second birefringent plate comprises a thickness which provides an offset of an optical signal passing through it equal to the center-to-center distance between a fiber of the inputting means and a fiber of the outputting means.

13. A dense wavelength division multiplexer for separating an optical signal into optical channels, comprising:
means for inputting an optical signal, the optical signal comprising a plurality of optical channels;
a first birefringent plate optically coupled to the inputting means and an outputting means;
a first and second half-wave plates, each partially optically coupled to the first birefringent plate on a side opposite to the inputting and outputting means, such that the first and second half-wave plates each is capable of intercepting approximately one-half of a signal from the first birefringent plate;
a second birefringent plate optically coupled to the first birefringent plate and to the first and second half-wave plates on a side opposite to the first birefringent plate;
a lens optically coupled to the second birefringent plate on a side opposite to the first and second half-wave plates;
a non-linear interferometer optically coupled to the lens and disposed at a distance equal to the focal length of the lens on a side opposite to the second birefringent plate, wherein the nonlinear interferometer comprises:
a first glass plate optically coupled to a second glass plate, forming a cavity,
a first reflective coating residing inside the cavity and on the second glass plate, wherein the first reflective coating comprises a reflective coating with a reflectivity of 100%,
a second reflective coating residing inside the cavity and on the first glass plate,
a first waveplate residing inside the cavity between the first and second glass plates, and
a second waveplate residing outside the cavity and optically coupled to the first glass plate; and
means for outputting the separated plurality of optical channels along a plurality of optical path.

14. A dense wavelength division multiplexer for separating an optical signal into optical channels, comprising:
means for inputting an optical signal, the optical signal comprising a plurality of optical channels;
a first birefringent plate optically coupled to the inputting means and an outputting means;
a first and second half-wave plates, each partially optically coupled to the first birefringent plate on a side opposite to the inputting and outputting means, such that the first and second half-wave plates each is capable of intercepting approximately one-half of a signal from the first birefringent plate;
a second birefringent plate optically coupled to the first birefringent plate and to the first and second half-wave plates on a side opposite to the first birefringent plate;
a lens optically coupled to the second birefringent plate on a side opposite to the first and second half-wave plates;
a non-linear interferometer optically coupled to the lens and disposed at a distance equal to the focal length of the lens on a side opposite to the second birefringent plate, wherein the nonlinear interferometer comprises:
a first glass plate optically coupled to a second glass plate, forming a cavity,
a first reflective coating residing inside the cavity and on the second glass plate,
a second reflective coating residing inside the cavity and on the first glass plate, wherein the second reflective coating comprises a reflective coating with a reflectivity of approximately 18%,
a first waveplate residing inside the cavity between the first and second glass plates, and
a second waveplate residing outside the cavity and optically coupled to the first glass plate; and
means for outputting the separated plurality of optical channels along a plurality of optical path.

15. A dense wavelength division multiplexer for separating an optical signal into optical channels, comprising:
means for inputting an optical signal, the optical signal comprising a plurality of optical channels;
a first birefringent plate optically coupled to the inputting means and an outputting means;
a first and second half-wave plates, each partially optically coupled to the first birefringent plate on a side opposite to the inputting and outputting means, such that the first and second half-wave plates each is capable of intercepting approximately one-half of a signal from the first birefringent plate;
a second birefringent plate optically coupled to the first birefringent plate and to the first and second half-wave plates on a side opposite to the first birefringent plate;
a lens optically coupled to the second birefringent plate on a side opposite to the first and second half-wave plates;
a non-linear interferometer optically coupled to the lens and disposed at a distance equal to the focal length of the lens on a side opposite to the second birefringent plate, wherein the nonlinear interferometer comprises:
a first glass plate optically coupled to a second glass plate, forming a cavity,
a first reflective coating residing inside the cavity and on the second glass plate,
a second reflective coating residing inside the cavity and on the first glass plate,
a first waveplate residing inside the cavity between the first and second glass plates, wherein the first waveplate comprises a $\lambda/4$ waveplate, and a second waveplate residing outside the cavity and optically coupled to the first glass plate; and means for outputting the separated plurality of optical channels along a plurality of optical path.

16. A dense wavelength division multiplexer for separating an optical signal into optical channels, comprising:

means for inputting an optical signal, the optical signal comprising a plurality of optical channels;

a first birefringent plate optically coupled to the inputting means and an outputting means;

a first and second half-wave plates, each partially optically coupled to the first birefringent plate on a side opposite to the inputting and outputting means, such that the first and second half-wave plates each is capable of intercepting approximately one-half of a signal from the first birefringent plate;

a second birefringent plate optically coupled to the first birefringent plate and to the first and second half-wave plates on a side opposite to the first birefringent plate;

a lens optically coupled to the second birefringent plate on a side opposite to the first and second half-wave plates;

a non-linear interferometer optically coupled to the lens and disposed at a distance equal to the focal length of the lens on a side opposite to the second birefringent plate, wherein the nonlinear interferometer comprises:
a first glass plate optically coupled to a second glass plate, forming a cavity,
a first reflective coating residing inside the cavity and on the second glass plate,
a second reflective coating residing inside the cavity and on the first glass plate,
a first waveplate residing inside the cavity between the first and second glass plates, and
a second waveplate residing outside the cavity and optically coupled to the first glass plate, wherein the second waveplate comprises a $\lambda/8$ waveplate; and means for outputting the separated plurality of optical channels along a plurality of optical path.

17. A system for separating an optical signal into optical channels, comprising:

a plurality of optical fibers for carrying the optical signal of a portion thereof; and a dense wavelength division multiplexer coupled to the plurality of optical fibers, comprising a plurality of separators at least partly arranged in a multi-stage parallel cascade configuration, each separator comprising:
at least one birefringent plate for separating a plurality of optical channels of the optical signal, wherein the separating is based on the polarization of the plurality of optical channels; and
a non-linear interferometer optically coupled to the at least one birefringent plate for introducing a phase difference between at least two of the plurality of optical channels, wherein the non-linear interferometer rotates a polarization plane direction of one of the at least two of the plurality of optical channels.

18. The system of claim 17, wherein each separator comprises:

a birefringent plate;

a first and second half-wave plates, each partially optically coupled to the birefringent plate, such that the first and second half-wave plates each is capable of intercepting approximately one-half of a signal from the birefringent plate;

a lens optically coupled to the birefringent plate and to the first and second half-wave plates on a side opposite to the birefringent plate;

a birefringent wedge optically coupled to the lens on a side opposite to the first and second half-wave plates; and the non-linear interferometer optically coupled to the birefringent wedge on a side opposite to the lens.

19. The system of claim 17, wherein each separator comprises:

a birefringent plate;

a half-wave plate partially optically coupled to the birefringent plate, such that the half-wave plate is capable of intercepting one-half of a signal from the birefringent plate;

a polarization beam-splitter optically coupled to the birefringent plate and the half-wave plate on a side opposite to the birefringent plate;

a prism optically coupled to the birefringent plate and the half-wave plate on a side opposite to the birefringent plate and also optically coupled to the polarization beam-splitter;

a lens optically coupled to the polarization beam splitter on a side opposite to the half-wave plate; and the non-linear interferometer optically coupled to the lens disposed at a distance equal to the focal length of the lens and on a side opposite to the polarization beam-splitter.

20. A system for separating an optical signal into a plurality of optical channels, comprising:

a plurality of optical fibers for carrying the optical signal of a portion thereof; and a dense wavelength division multiplexer coupled to the plurality of optical fibers, comprising a plurality of separators at least partly arranged in a multi-stage parallel cascade configuration, each separator comprising:
a first birefringent plate,
a first and second half-wave plates, each partially optically coupled to the first birefringent plate, such that the first and second half-wave plates each is capable of intercepting approximately one-half of a signal from the first birefringent plate,
a second birefringent plate optically coupled to the first birefringent plate and to the first and second half-wave plates on a side opposite to the first birefringent plate,
a lens optically coupled to the second birefringent plate on a side opposite to the first and second half-wave plates, and
a non-linear interferometer optically coupled to the lens and disposed at a distance equal to the focal length of the lens on a side opposite to the second birefringent plate, wherein the non-linear interferometer introduces a phase difference between at least two of the plurality of optical channels.

* * * * *